(12) United States Patent
Montez et al.

(10) Patent No.: US 10,812,645 B2
(45) Date of Patent: Oct. 20, 2020

(54) HANDLEBAR SYSTEMS AND METHOD

(71) Applicants: Carla Marie Montez, Aurora, CO (US); Gabriel Sarikov, Denver, CO (US)

(72) Inventors: Carla Marie Montez, Aurora, CO (US); Gabriel Sarikov, Denver, CO (US)

(*) Notice: Subject to any disclaimer, the term of this patent is extended or adjusted under 35 U.S.C. 154(b) by 82 days.

(21) Appl. No.: 16/243,043

(22) Filed: Jan. 8, 2019

(65) Prior Publication Data
US 2019/0149645 A1 May 16, 2019

Related U.S. Application Data

(63) Continuation-in-part of application No. 15/832,208, filed on Dec. 5, 2017.
(Continued)

(51) Int. Cl.
| H04M 1/725 | (2006.01) |
| B62K 21/12 | (2006.01) |
| B62K 19/40 | (2006.01) |
| H04B 1/3877 | (2015.01) |
| F16B 2/02 | (2006.01) |

(Continued)

(52) U.S. Cl.
CPC .......... *H04M 1/7253* (2013.01); *B62K 19/40* (2013.01); *B62K 21/12* (2013.01); *F16B 2/02* (2013.01); *F16B 2/065* (2013.01); *F16B 21/073* (2013.01); *H04B 1/3877* (2013.01); *H04M 1/04* (2013.01); *H04W 4/90* (2018.02); *H04W 76/14* (2018.02); *B62J 43/00* (2020.02); *B62J 45/40* (2020.02); *H04W 4/027* (2013.01); *H04W 4/029* (2018.02); *H04W 4/46* (2018.02); *H04W 4/70* (2018.02); *H04W 4/80* (2018.02)

(58) Field of Classification Search
CPC ....... H04M 1/7253; H04M 1/04; H04W 4/90; H04W 76/14; B62K 19/40; B62K 21/12; F16B 2/02; F16B 2/065; F16B 21/073; H04B 1/3877
See application file for complete search history.

(56) References Cited

U.S. PATENT DOCUMENTS

| 6,983,949 B2 * | 1/2006 | Ueno ..................... B62K 21/12 280/279 |
| 2016/0059920 A1 * | 3/2016 | Takanashi ................ B62J 45/10 74/551.8 |

(Continued)

*Primary Examiner* — Nguyen T Vo
(74) *Attorney, Agent, or Firm* — Charles Runyan

(57) ABSTRACT

A handlebar system that provides a multi-functional handlebar component for a cycle or similar vehicle. The system includes a housing containing a battery, a handlebar mount configured to attach to the cycle, a subcomponent housing; an energy storage module mechanically coupled to the subcomponent housing; a user interface fixed to the subcomponent housing, and including a speaker, a microphone, and at least one manual input. The user interface is adapted to communicate a command from a user; a communication module fixed to the subcomponent housing and electrically coupled to the energy storage module, the communication module including a transceiver electrically coupled to the energy storage module. The transceiver configured to wirelessly communicate with at least one external communication network and a memory electrically coupled to the energy storage module.

19 Claims, 14 Drawing Sheets

Related U.S. Application Data

(60) Provisional application No. 62/507,967, filed on May 18, 2017.

(51) Int. Cl.

| | | |
|---|---|---|
| *H04W 76/14* | (2018.01) | |
| *F16B 2/06* | (2006.01) | |
| *F16B 21/07* | (2006.01) | |
| *H04M 1/04* | (2006.01) | |
| *H04W 4/90* | (2018.01) | |
| *H04W 4/80* | (2018.01) | |
| *H04W 4/02* | (2018.01) | |
| *H04W 4/70* | (2018.01) | |
| *H04W 4/029* | (2018.01) | |
| *H04W 4/46* | (2018.01) | |
| *B62J 43/00* | (2020.01) | |
| *B62J 45/40* | (2020.01) | |

(56) References Cited

U.S. PATENT DOCUMENTS

| | | | |
|---|---|---|---|
| 2017/0361894 A1* | 12/2017 | Gahlert | G06F 3/033 |
| 2018/0001950 A1* | 1/2018 | Allen | B62J 99/00 |
| 2018/0222473 A1* | 8/2018 | Shami | B60W 30/0956 |

* cited by examiner

HANDLEBAR SYSTEMS AND METHOD

CROSS REFERENCE TO RELATED APPLICATION

This application is a continuation-in-part and is related to U.S. patent application Ser. No. 15/832,208 filed Dec. 5, 2017 and is related to and claims priority to U.S. Provisional Patent Application No. 62/507,967 filed May 18, 2017, both of which are incorporated by reference herein in their entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of attachments and accessories for land vehicles and more specifically relates to attachments and accessories for motorcycles and bicycles including communication devices.

2. Description of Related Art

Smart mobile devices incorporating communication technologies have become an indispensable aspect of people's daily lives. The expanding availability of smart phones, tablets, and similar mobile communication devices are changing the way we receive, send, and control information; however, it is not always convenient to use these devices during certain activities. Bicycle and motorcycle riders are often restricted in their ability to safely interact with such devices and exchange information while riding. However, there are many situations where availability of services and devices bringing voice and digital communication and various other device interaction can bring safety, convenience, and other values to the rider on board or in proximity to their cycle. New technologies addressing this issue, such as incorporation of currently-unavailable features within a handlebar upgrade, would benefit many riders.

A wide range of interactive and non-interactive computing functions may be useful to enhance the riding experience. By way of example, riders may desired to record aspects of their rides whether it be for entertainment or safety reasons. People in a biking competition may wish to record their ride to identify incorrect techniques and effectively improve on their race times. Others may wish to document a route or area during a ride. Moreover, operators may wish to monitor the security of their cycle via their smart device while the cycle is parked and they are away. Rental operators may wish the ability to send and receive information about the bike and/or rider. A system designed to address these needs would be of great benefit in this field.

Prior attempts have been made to address these issues. For example, U.S. Pub. No. 2014/899,501 to Hines et al. relates to a bicycle system. The field of the invention relates to bicycle systems, especially to bicycle systems adapted for use with smartphones, to smartphones configured for use with bicycle systems, and to methods and to computer software for use with such bicycle systems or smartphones, and to servers configured to communicate with such bicycle systems or smartphones. According to a first aspect of the invention, there is provided a bicycle including a battery integral to the bicycle, wherein the processor is powerable by the battery, the bicycle system including a smartphone holder configurable to receive a smartphone and to connect the smartphone to the processor, wherein in use the smartphone holder is attachable to, and detachable from, the smartphone. Advantages include that the smartphone can be charged by the battery, the smartphone can communicate with the processor so as to receive various information such as maintenance-related information of the bicycle system, the bicycle system can investigate the smartphone identity to check for unauthorized use of the bicycle system, the smartphone is held during bicycle system travel which reduces the risk of damage to the smartphone, and the bicycle system shape is more aerodynamic than that of a bicycle to which a processor and/or a battery has merely been bolted-on. The above-noted reference fails to provide the combined multi-functional structures and features of Applicant's disclosed handlebar system and method. In particular, the above-noted reference fails to disclose a handlebar two-way communication technology capable of communicating with an outside network, as provided by the applicant's handlebar system disclosed below, which can operate with or independently of the cycle operator's mobile communication devices. Moreover, the functional components of the above-noted reference are spread throughout the bike, rather than conveniently combined within the handlebar. Thus, the handlebar system disclosed below can be installed in new bikes and may be provided as an upgrade to nearly any bike, without requiring significant changes to the rest of the cycle or its architecture.

BRIEF SUMMARY OF THE INVENTION

In view of the foregoing disadvantages inherent in the known attachments and accessories for land vehicles art, the present disclosure provides a novel handlebar system and method. The general purpose of the present disclosure, which will be described subsequently in greater detail, is to provide a multi-functional handlebar for a cycle or similar vehicle having communication technology.

A handlebar system for a cycle is disclosed herein. The handlebar system may include a handlebar configured to attach to and steer the cycle, the handlebar having a left hand end and a right hand end, a cross-member extending between the left hand end and right hand end, the cross-member including a subcomponent housing. In addition, the handlebar system may include an energy storage module mechanically coupled to the subcomponent housing, a user interface as a part of the handlebar, which is attached to and/or associated with the subcomponent housing, and including a speaker, a microphone, and at least one manual input, the user interface adapted to communicate a command from a user. The handlebar system may further include a communication module fixed to the subcomponent housing and electrically coupled to the energy storage module, said communication module including a transceiver electrically coupled to the energy storage module, said transceiver configured to wirelessly communicate with at least one external communication network. Furthermore, the handlebar system may include a memory electrically coupled to the energy storage module, said memory configured to store an executable application, the executable application operable to communicably couple the communication module with at least one external communication network via the transceiver and establish a full duplex communication link there between, and provide for interoperation of the communication module and the user interface. In addition, the handlebar system may include a processor embedded in the subcomponent housing, electrically coupled to the energy storage module, and communicably coupled to the communication module, the memory, and the user interface, said processor configured to execute the executable application upon detection of user interaction with said handlebar system.

A method of augmenting a handlebar of a cycle is also disclosed herein. Such method includes the steps of providing a handlebar configured to attach to and steer the cycle, the handlebar having a left hand end and a right hand end, left and right being in some geometries reversible, extending a cross-member between the left hand end and right hand end, the cross-member including a subcomponent housing, mechanically coupling an energy storage module to the subcomponent housing, fixing a user interface to the subcomponent housing, said user interface including a speaker, a microphone, and at least one manual input, said user interface adapted to communicate a command from the user, embedding a communication module in the subcomponent housing, said communication module including a transceiver electrically coupled to the energy storage module, said transceiver configured to wirelessly communicate with at least one external communication network, embedding a memory in the subcomponent housing, and said memory electrically coupled to the energy storage module, said memory configured to store an executable application, the executable application operable to communicably couple the communication module with at least one external communication network via the transceiver and establish a communication link there between, and provide for interoperation of the communication module and the user interface; and embedding a processor in the subcomponent housing, said processor electrically coupled to the energy storage, and communicably coupled to the communication module, the memory, and the user interface, said processor configured to execute the executable application upon detection of user interaction with said handlebar system. The method may further include the step of installing the handlebar on the cycle.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a handlebar system and method, constructed and operative according to the teachings of the present disclosure.

The various embodiments of the present invention will hereinafter be described in conjunction with the appended drawings, wherein like designations denote like elements.

DETAILED DESCRIPTION

Figure 1:
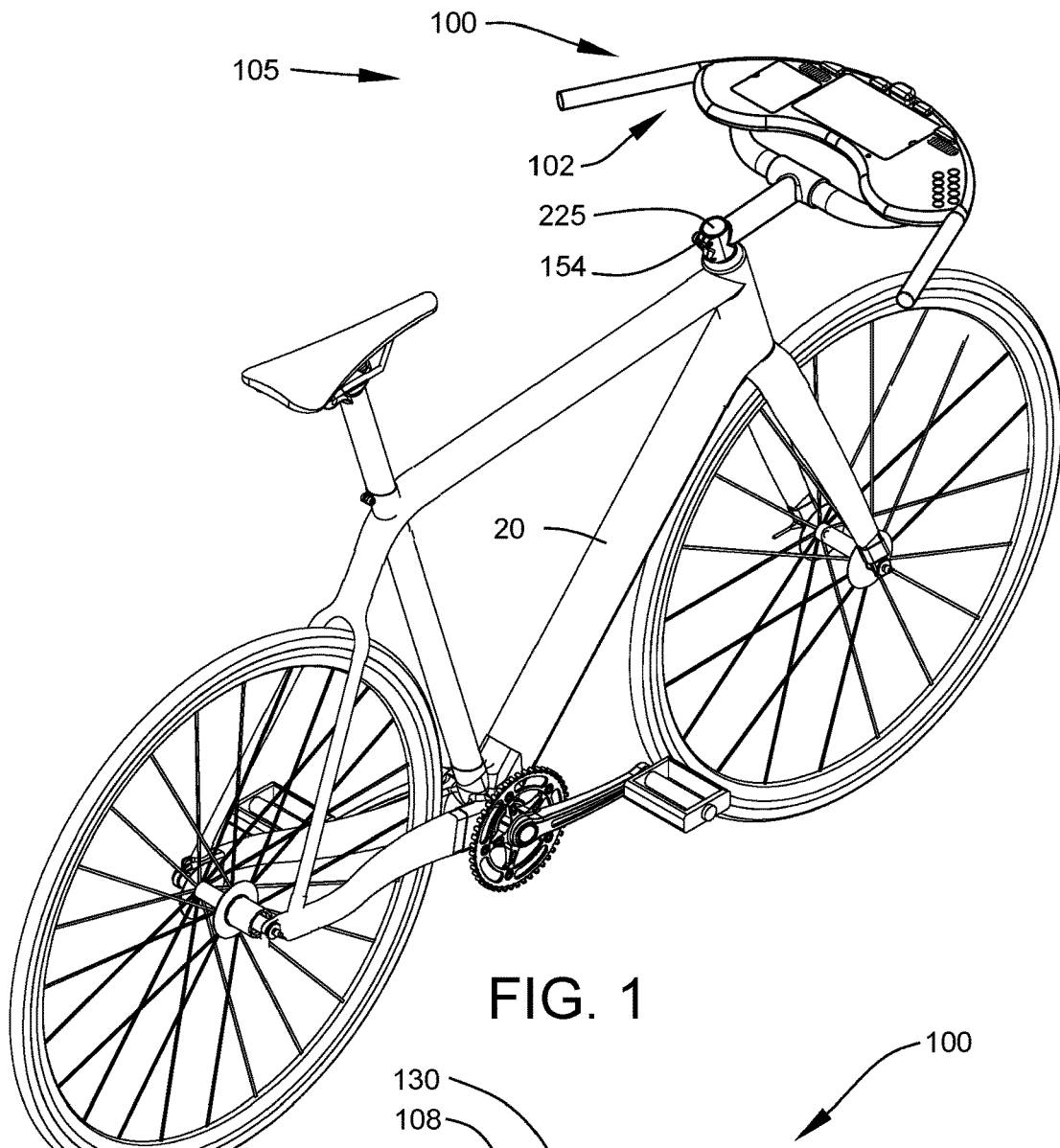
FIG. 1 is a perspective view of a handlebar system during an "in-use" condition, according to an embodiment of the present disclosure.

As discussed above, embodiments of the present disclosure relate to an attachments and accessories for land vehicles and more particularly to a handlebar system and method as used to improve the attachments and accessories for enhancement of motorcycles and bicycles.

Generally, the embodiments of the present disclosure provide multi-functional handlebars for cycles and similar vehicles having handlebar-type steering. The disclosed handlebar system may provide a wide range of enhanced functions and features. These objectives of the disclosure include, but are not limited to the following:

A) wireless communication capability within bicycles, tricycles, velomobiles, E-bikes, scooters, and motorcycles, collectively referred to herein as "cycles". There are many examples where a convenient means for establishing a real-time communication link with a remote individual or site while riding would be of great benefit to cyclists or bikers. As noted above, holding a cell phone or similar communication device during a ride can be both difficult and disruptive to the ride. Having to stop the ride, pull over to the side of the road, and make a phone call can be inconvenient if a call must be made or taken. For example, a rider may need to quickly call emergency services should an accident or other threatening situation occur. Riders may want a dedicated hands-free communication system for their bike, including the ability to link an on-board system to their personal phone, which may be in near proximity (such as a pocket or bag) while riding. Bike rental operators may wish to monitor the bikes during use. Coaches and riders may wish to access real-time data, recorded data, or other information during or after training sessions. All such data can be accessible to the rider during use, and available via network stream or written into data storage.

B) Integrating video capture capability by including a video/camera/recorder that is actuated by control elements in the handlebar, and alternatively controlled and displayed by a smart device computer such as tablet, cell phone or other installed as an integral part of the handlebar. The handlebar system may have multiple camera lenses and connect to other distributed cameras and can manage and integrate different feeds in real time. The handlebar system may feature digital processors with digital memory devices into the handlebar system. The handlebar system may be provided with smart device or receive and integrally control a smart device brought to the handlebar system, via wired or wireless connection. Riders and users of vehicles and devices controlled by handlebars may desire to record their rides whether it be for documentation, information or safety reasons. They may also want to see a video feed, whether it is live from their camera, transmitted, projected by a smart device computer or otherwise. Competitive bikers and those in training may wish to record their ride and have a monitor to identify incorrect techniques and effectively improve on their race times and general performance. Further, some people may wish to have an ongoing recording of their ride in order to document a variety of aspects, be that to advertise a surrounding area, document aggressive driving around them, or simply to have a recording of their travels. Police may, for many reasons, want to have video recording be acquired, transmitted from or be received by their "cycle based info system". Individuals or entities who have had their vehicle stolen, or simply become lost, may want to remotely acquire video and location information from their missing bike.

C) Integrating music and audio capability to allow cyclists and motorcycle riders may enjoy listening to music as they ride on the road, on a trail, or other environment. This capability allows for a more enriched riding experience, particularly on longer rides. The presently disclosed system allows riders to combine with other tasks during a ride. Audio reception and transmission is essential in phone communications, video acquisition, projection, and related communication. Audio can also be important for police, either in speaking with their station, or in connecting to a loudspeaker forming a bullhorn device. The ability to interoperate with "smart helmets" and other smart devices allows the presently disclosed system to be a control center for all these technologies.

D) Providing the capability of adding ancillary devices. A variety of smart components, devices, and features may be added to the system to enhance aspects of riding. These may include rider and vehicle performance metrics, location devices, vehicle to vehicle signals and communications as well as person to person and rider to vehicle communications. A variety of motorcycle, bicycle and e-bike "monitors" can crowd and confuse the rider, although the many feedback metrics can be very important in and of themselves. Security from theft and vandalism is a concern that increases as the number and importance of attachments visibly grows. Safety headlights, taillights, safety markers and turn signals are important attachments to many bikes and are expected to increasingly become popular in the future. Current handlebar systems generally "attach" various devices to the handlebars, which exposes the devices to weather elements, often increased aerodynamic forces and drag slowing the vehicle. They also are exposed from a security point of view and often need to be removed and are vulnerable to damage while in transit and even in normal usage.

Many individuals in modern society drive pedal bikes, e-bikes, scooters, exercise machines and motorcycles for transportation and/or pleasure. Shared and Rental cycles of all types described need smart, durable and secure systems for monitoring, accepting payments, locating and alerting for service needs.

The present handlebar system may provide bicycles, e-bikes, scooters, exercise machines and motorcycles with a uniquely-designed set of handlebars (normally used for bike control, steering, stability, shifting and braking) enhanced with the capability of making and receiving phone calls, recording, monitoring and live-streaming video, playing music, and interacting with other system and network devices in the bike, the vicinity of the bike, and the greater internet. Beneficially, these features may bring both convenience and enjoyment, safety and liability protection in the case of accident or altercation, and professional value with regards to developing video, and providing coaching level feedback for athletes. Security, aerodynamics, aesthetics and function is enhanced by integrating elements within the handlebar rather than generally mounting monitors and controls via attachments to the handlebars. New technologies are becoming available every year and a modular internal handlebar platform that allows easy integration into the wide range of new and existing vehicles and devices requiring or using handlebars brings safety and many other beneficial aspects, such as expanding the use of energy efficient transportation, which brings a wide range of incremental benefits to society.

Vehicle to vehicle communications, likewise, is very important in terms of improving accident avoidance and safety. E-bike and other information streams from modern bikes likewise are best used when visible and understood, allowing the rider to maximize and trust their system, their potential range and any maintenance information which may be available but not always easily accessed and known.

The handlebar system disclosed herein may provide a modular hardware interface with which to access these different information streams. Audio and video integration can be achieved while protecting and securing the valuable components and reducing as much as possible, parasitic aerodynamic drag. The handlebar system can include one or multiple camera lenses designed to record video while cycling, scooting or riding on a motorcycle. It also can integrate feeds from separate cameras or lenses which may be connected to the system controls and monitors. The handlebar may be designed to optimize camera position as well as aerodynamics, all while integrating security features.

It is foreseen that a telescoping and retractable boom may even be into the handlebar that can be positioned or hidden for camera acquisition purposes. The integral component handlebar system will feature digital processors, digital memory devices (cards, drives, and combinations and variations of such) and also be able access other local networked storage devices so users can record and also transmit live video during their ride.

Remote access to live video can be used for athletic evaluation, for security reasons, such as when a bike has been stolen, as well as by police and other individuals to interface with their team and to either send or receive important video or data streams. Solar charger can be as well as charging ports for integral batteries capable of keeping the phone system powered for long durations. Such power systems allow users to maintain or recharge the handlebar system via rechargeable batteries that can be located in the handlebar or in other parts of the bicycle, tricycle, e-bike, scooter, velo-mobile or motorcycle.

The present handlebar system may also enhance an exercise experience and can motivate the rider through real time coaching, music, gamification, videos, and more. Examples of gamification include competitive challenges with others or simply allowing one to participate in other learning or drills while riding, allowing exercise to not be viewed perhaps as "unproductive" periods in one's life. Being able to safely and efficiently take a call while riding has similar benefits.

Ancillary connections may include integral network connectivity via the integration with smart device accessing Cellular, Wi-Fi and other network connectivity, options therein, including, Bluetooth, CAN bus, ANT protocol devices and other wireless and wired connectivity to other smart devices in and around the handlebar equipped vehicle or device.

The handlebar may include modular elements built into its architecture to accommodate various elements such as Wi-Fi, GPS, localized battery power, memory, data and logging, rental systems, emergency calling, emergency beacons, etc. Specialized connectivity to various power connectivity, anti-theft devices, movement and payload lighting, be it head and tail lights, police style red and blue flashers, as well as emergency markers and general turn signals, which can all be into and/or controlled from the handlebar system with internal functions. Input via interfaces, be they touch enabled monitors, volume controls, alphanumeric keyboards, visual monitors, and whole phone/tablet/computer interfaces, which can be built into the handlebar system. Shared bike/vehicle systems need a myriad of information, transmission and monitoring in consistent yet upgradable systems formats. The handlebar system disclosed herein will facilitate a variety of cycles and connected systems to be controlled and used by rental vendors, host entities such as college and universities, corporations, and entrepreneurs. The disclosed system may assist these entities by supporting geographical mapping, providing information on where to return a bike nearby, as well as system operators indicating where their vehicle may have been left, is now available for rent, may need a service call, or simply is in transit.

Integrating all primary systems within the handlebar achieves higher levels of aesthetics, aerodynamics, weather protection, and interface simplification. The disclosed handlebar is configured with very high and needed levels of structural strength in and flexible organization of the handlebar system within the handlebar and on its surfaces. The handlebar system is adapted to enhance the functional capabilities of bicycles, e-bikes, velo-mobiles, tricycles, scooters, and motorcycles. The handlebars are with various modular technological hardware devices such as Bluetooth connections, speakers, and microphones, phone connectivity systems, video recording tools, battery bays, storage bays, etc.

In order to turn on the components within the handlebars, each rider may login with a password in order to turn on the system, in order to work any of the components within the handlebars. The handlebars may feature several distinct sub-systems in order to provide riders and/or owners with an enhanced riding experience, enhanced ownership information, security, ability to conduct bicycle rental operations, etc. The phone integration is a call system for handlebar equipped vehicle or equipment. The handlebars can connect to one or more "network devices" such as cell phones or related network devices. The handlebar system may include technology capable of making and receiving phone calls, texts and other communications while with the bike with ergonomic and accessible controls which can include keyboard, speaker, headset and microphone controls. The handlebar system can be paired with Bluetooth or tether technology system headphones or a headset for hands-free calling or be operated with speakers, which can be built into the handlebars themselves. The handlebar system can be powered via a solar panel and/or rechargeable batteries, a generator (also referred to as a dynamo generator), or hybrid combinations of the above-noted power sources, which may be used as a power supply in the bike itself. The handlebars may work with cellular network technology, so the system will be able to make and receive calls. Riders can clearly hear phone calls via the system speakers, which may integrate noise-eliminating technology in both speakers and microphone, thus eliminating the need to stop a ride in order to access mobile communication. n some embodiments, the user's phone may be used as a supplemental interface. Various control systems can be including, touch, voice control and with usable peripherals even "eye control" for video and system interactions. The video recording integration is designed to acquire and record video. A control panel can be used to activate and record the videos while speakers are capable of emitting audio associated with the recordings. An image-capture device (such as a camera lens and CCD device) can be installed in various front and rear facing parts of the handlebars and be adjustable for direction and level. Remotely controlled panning camera system can also be into the handlebars controlling integral lenses and cameras as well as networked cameras. Such cameras can obtain both moving video and traditional picture photography with controls into the handlebar to control this acquisition. Remote video, audio and data acquisition can be used to locate vehicles, their riders and their situation. Users can activate the system and record video as they ride the handlebar-equipped cycle. The video and images can be recorded or live-streamed for people to watch. The video may be stored on a digital disk drive, an SD memory card, or other local networked storage devices such as one's cell phone. Audio integration is capable of playing music and other types of audio such as dispatch communication for the rider who might be a delivery person, police or mobile service professional. A software application may be included, enabling music to be played while an individual rides. A speaker for audio and music as well as and a headphone jack, microphone adaptor and wireless connections to variations thereof can all be integrated into the handlebar system. The handlebars can be installed on both new and previously used handlebar-equipped vehicles and devices.

All components of the handlebar may be constructed using composites, alloy, steel and other suitable structural and waterproof materials capable of supporting the stresses required of handlebars in their specific vehicle, and withstanding and protecting in various weather elements. Handlebars can be made in hollow form, as well as component structure form allowing mating pieces to open and close, enhancing strength in closed and constrained shapes, while allowing access in fabrication and configuration times. The handlebars may accommodate the loading and unloading of various elements either through a "magazine" feed system, or from a separable top and bottom clam-shell aspect which can be built intact and sealed structurally or built so that long term service can be accomplished by opening or removing critical internal elements. Top and bottom elements will combine to structurally enhance the handlebar while also integrating various elements to provide safety, security and function.

Embodiments of the handlebar system may include both locking and quick-release feature that include detachment mechanisms of the handlebar, which can be used to secure the bike (or make unusable) and to protect the valuable systems that the handlebar and its elements constitute. Remote control, monitoring and shutdown of systems within the network connected handlebars can facilitate security as well as simple "rental time agreements", rider retrieval in times of breakdown, one way rentals and other services and potential requirements. In all, the handlebar system brings a myriad of capabilities to handlebar-controlled vehicles, and does so in a flexible yet contained way, and can be applied and used in the wide realm of handlebar-controlled vehicles in the marketplace today and those new types and variations which we will have in the future. It should be noted that exact size, measurement, construction, and design specifications may vary upon engineering and manufacturing.

Referring now more specifically to the drawings by numerals of reference, there is shown in FIGS. 1-10 and in FIGS. 11-18, various embodiments of a handlebar system 100. FIG. 1 shows a functionally-enhanced handlebar 102 of the handlebar system 100 during an 'in-use' condition 105, according to an embodiment of the present disclosure. As illustrated, the handlebar 102 is configured to attach to and steer a cycle 20, or similar vehicle. The handlebar 102 may have a left hand end 104 and a right hand end 106, as shown. A cross-member 120 may extend between the left hand end 104 and right hand end 106. The handlebar 102 may include a pair of hand grips 122 configured to assist hand gripping of the handlebar 102 by a user. Each hand grip 122 may be attached to a respective one of the left hand end 104 and the right hand end 106 of the handlebar 102, as shown.

As noted above, one aspect of the handlebar system 100 is to provide communication features permitting cyclists or bikers to safely and conveniently establish a real-time communication link with remote individuals or network sites while riding. This includes sending or receiving phone calls during operation of the cycle 20. In this regard, the handlebar 102 includes a set of subcomponents functioning to allow the user to connect and communicate via voice, data and radio networks, supporting messaging and data signaling person to person, vehicle to vehicle, GPS transmission and reception as well as vehicular data streams between the handlebar system and other devices. This hands-free feature of the system reduces or eliminates the need to stop the ride, pull over to the side of the road, and make a phone call or to send and receive internet data. It also allows the handlebar to be used while the bike is stationary as a computing and communications platform. Embodiments of the presently disclosed system may be configured interoperate with the Internet of things (IoT), which is the network of physical devices, vehicles, home appliances, and other items embedded with electronics, software, sensors, actuators, and network connectivity which enable these objects to connect and exchange data. Embodiments of the presently disclosed system are further designed to provide a communication link to a user's personal phone and/or smart device engaged within the handlebar 102 or located in near proximity. In the present disclosure, the term "cycle shall be understood to include bicycles, tricycles, velo-mobiles, E-bikes, scooters, motorcycles, and other vehicles and simulators which use handlebars as part of user steering, control and hand fixation.

Figure 2:
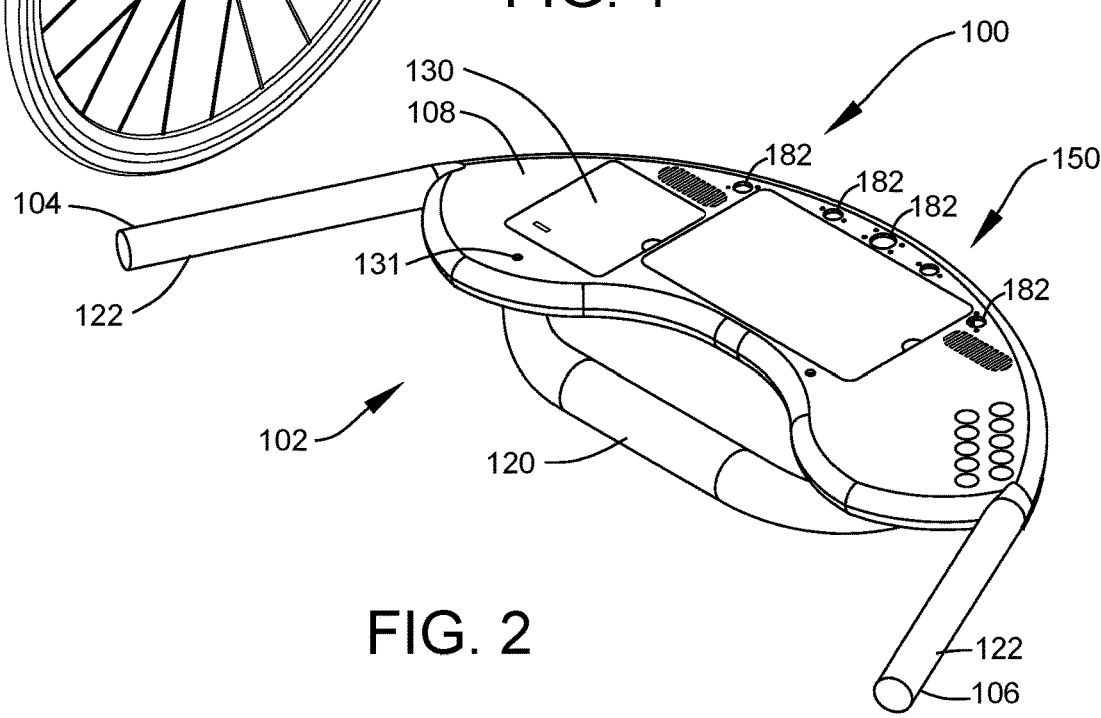
FIG. 2 is a detail view, of the handlebar system of FIG. 1.
Figure 3:
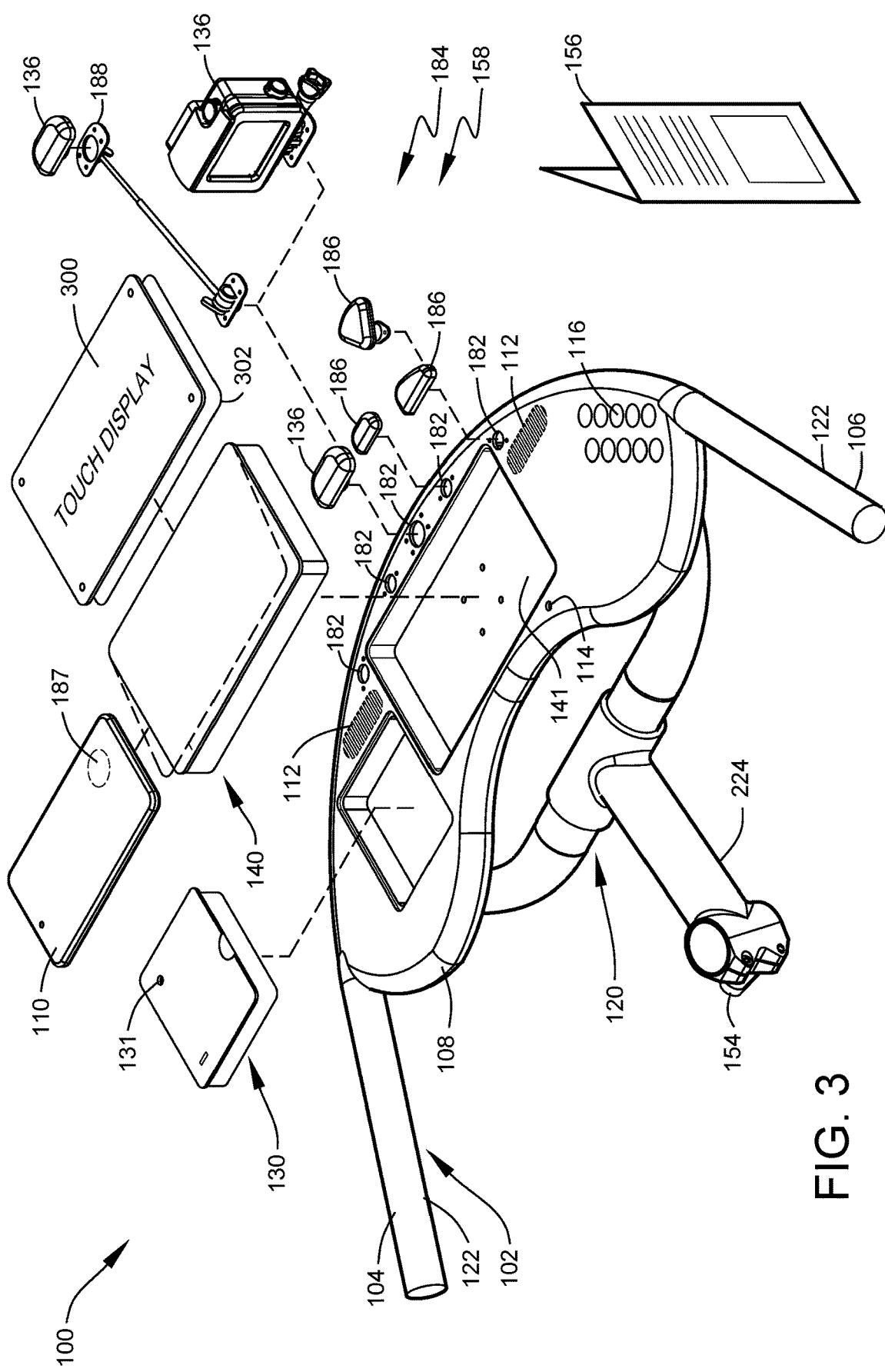
FIG. 3 is an exploded perspective view of the handlebar system of FIG. 1, according to an embodiment of the present disclosure.
Figure 4:
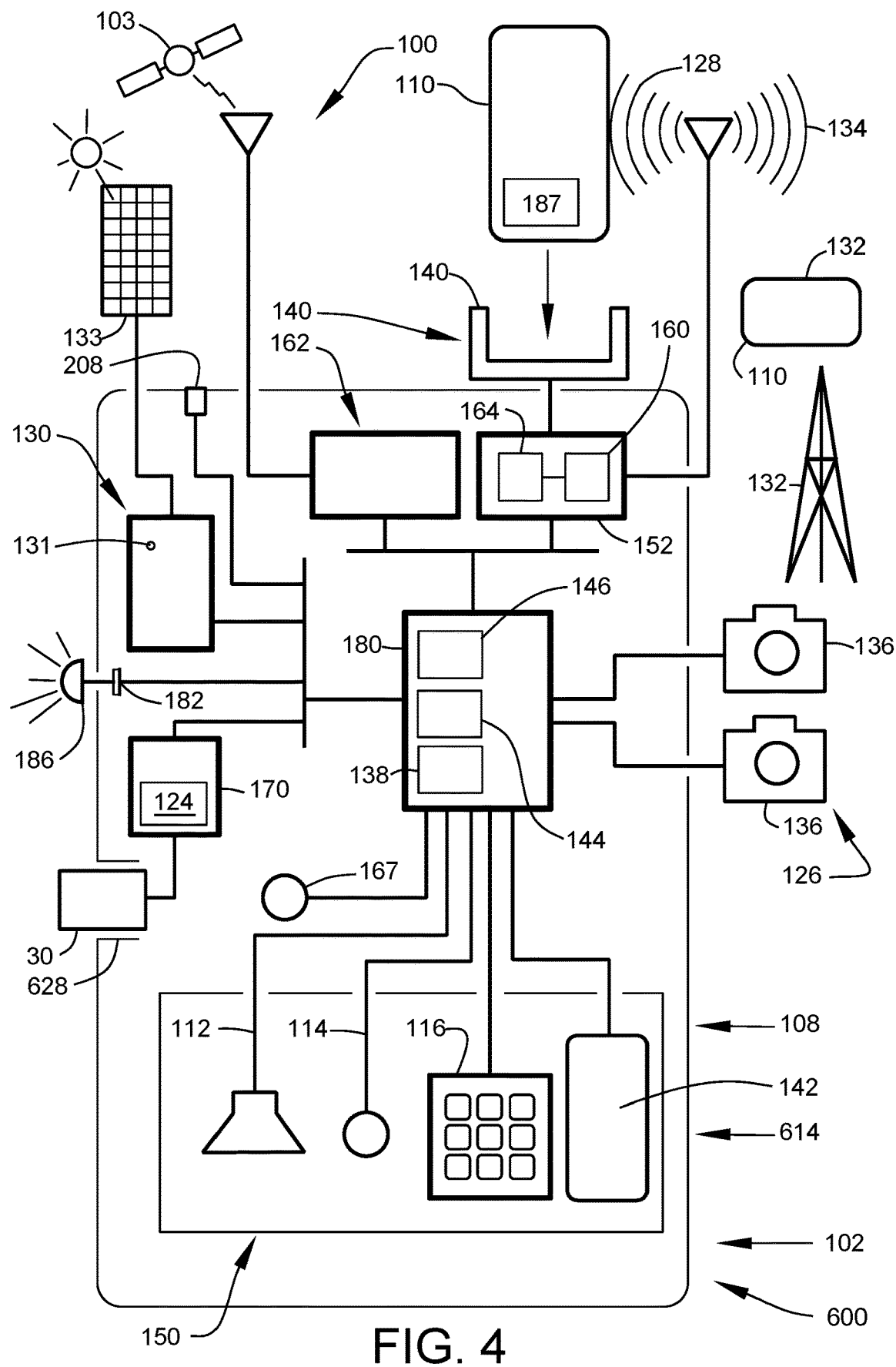
FIG. 4 is a schematic diagram of the handlebar system of FIG. 1, according to an embodiment of the present disclosure.

FIG. 2 is a perspective view, enlarged for clarity, of the handlebar 102, according to the embodiment of FIG. 1. FIG. 3 is an exploded perspective view of the handlebar 102 of FIG. 1, according to an embodiment of the present disclosure. FIG. 4 is a block diagram illustrating functional relationships between subcomponents of the handlebar 102 of FIG. 1, according to an embodiment of the present disclosure.

Figure 7:
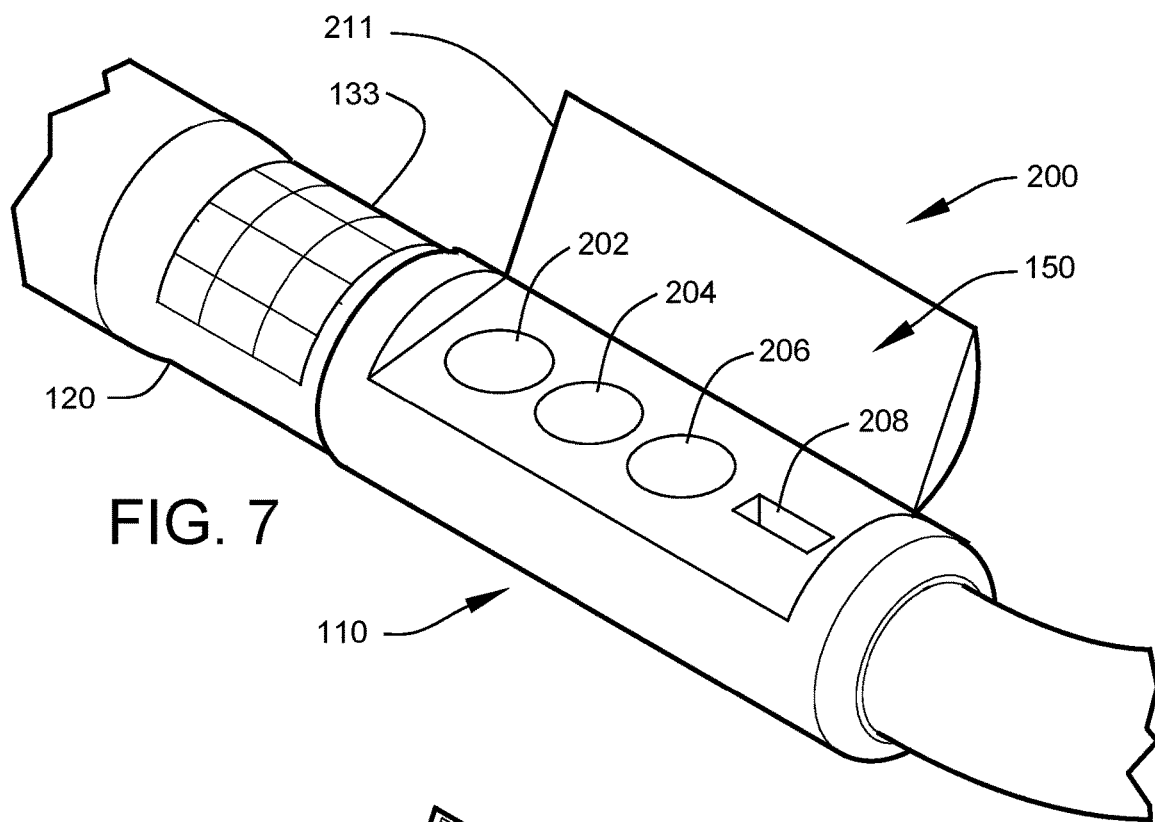
FIG. 7 is a detail view of a user interface of the handlebar system of FIG. 5, according to an embodiment of the present disclosure.

Referring to FIG. 1 through FIG. 4, the cross-member 120 may include a subcomponent housing 108, as shown. The subcomponent housing 108 may include an energy storage module 130 in the form of an on-board battery pack, or other compact power supply. The energy storage module 130 may be within the subcomponent housing 108 and may allow the user to recharge the system via rechargeable batteries, which can be located in the handlebar or in other parts of the cycle 20. In one embodiment of the system, the energy storage module 130 is supplied as a removable battery (cell or battery pack), which may be mechanically coupled to the subcomponent housing 108, as shown. Both the housing and the removable battery pack may include a charge port 131 to enable charging of the energy storage module 130 without removal of the battery. In other embodiments of the system, power may be supplied via a secondary source, such as a solar panel 133 (as generally illustrated in FIG. 7). Upon reading this specification, it should be appreciated that, under appropriate circumstances, considering such issues as user preferences, design preference, structural requirements, marketing preferences, cost, available materials, technological advances, etc., other power arrangements such as, for example, providing an onboard DC generator utilizing the turning of the wheels to generate electrical power, providing a means for deriving power from a mobile computing device, utilizing inductive recharging technology, providing an alternator delivering alternating current (AC) that is passed through a bridge rectifier and a bulk filter capacitor to a charger adapted to provide an appropriate output charging voltage matched to the onboard rechargeable battery, providing a battery management system (BMS) to manage the onboard rechargeable battery, etc., may be sufficient.

With specific reference to FIG. 4, the handlebar 102 may include a communication module 152 fixed to the subcomponent housing 108 and electrically coupled to the energy storage module 130. The communication module 152 may include transceiver 160 configured to wirelessly communicate with at least one external wireless communication network 134. More specifically, the transceiver 160 may be adapted to communicably couple with one or more external communication networks via at least one wireless connection 128. Such networks may include cellular networks, W-Fi networks, satellite networks, Bluetooth networks, networks using CAN bus protocols, ANT networks, FM networks, and the like.

A human interface device identified herein as user interface 150 may be fixed to the subcomponent housing 108, as shown. As noted above, the user interface 150 may include a speaker 112, a microphone 114, and at least one manual input 116. The user interface 150 may be adapted to communicate a command from the user; for example, the user interface 150 may be used to control the speaker volume, receive text or voice data, or may be used to remotely control a user's mobile computing device 110. In some embodiments, the system is configured to operate using voice commands. Upon reading this specification, it should be appreciated that, under appropriate circumstances, considering such issues as user preferences, design preference, marketing preferences, cost, available materials, technological advances, etc., other user interface arrangements such as, for example, incorporating wireless communication technology (such as Bluetooth and similar wireless technologies) allowing the system to pair with a user's handheld device, thus allowing the handheld device to provide user-interface functionality, etc., may be sufficient. As noted above, mobile computing devices contemplated for use with the present system may include; cell phones, smart phones, laptops, notebooks, tablet/slate PCs, netbooks, and the like.

A memory 170 may be embedded in the subcomponent housing 108 and may be electrically coupled to the energy storage module 130. The addressable memory 170 may be configured to store an executable application 124 operable to communicably couple the communication module 152 with the external wireless communication network 134 via the transceiver 160 and establish full duplex communications between the communication module 152 and the external wireless communication network 134, local wireless device, or both. Furthermore, the executable application 124 may enable interoperation of the communication module 152 and the user interface 150. The memory 170 may include one or more digital memory devices (e.g., fixed and removable cards, chips, drives, etc.) and may include other local networked storage devices. The system may include slots for a subscriber identification module, commonly known as a SIM card 30, etc. The SIM card 30 may be operably coupled to the memory and the processor.

The handlebar 102 may further include a processor 180 embedded in the subcomponent housing 108. The processor 180 may be electrically coupled to the energy storage module 130, and communicably coupled to the communication module 152, the memory 170, and the user interface 150. The processor 180 may be configured to execute the executable application 124 upon detection of user interaction with the handlebar system 100. One embodiment, accordingly, provides for the processor 180 to be mounted to a mainboard or motherboard 302, as shown. The motherboard 302 may include the memory 170, and system modules supporting mobile-phone-communication capability. In some embodiments of the system, the subcomponent housing is configured to allow the motherboard to be replaceable and may be configured to have loose drop-in components. In this arrangement, an end user may configure the handlebar to include specific user-selected features, and may subsequently upgrade the handlebar, as needed. Upon reading this specification, it should be appreciated that, under appropriate circumstances, considering such issues as user preferences, design preference, marketing preferences, cost, available materials, technological advances, etc., other system arrangements such as, for example, providing one of several different versions of the motherboard, unpopulated motherboards (a motherboard with a processor), adaptors for connecting updated versions of the processor, arranging for upgrades either by downloading new firmware or adding/replacing hardware components etc., may be sufficient. It is noted that that, in some arrangements of the system, the "sub-component housing" may itself be structured and arranged to function as a "motherboard" on which computer components may be mounted. Moreover, the handlebar may be configured and arranged as a housing (akin to a computer case) into which small computers and components may be mounted.

The handlebar system may be equipped with a micro heat-pipe/plate, thermal-cycle condenser, exchanger, or similar cooler technology to cool and lower the temperature of the handlebar electronic components. A dedicated touchscreen display panel 300 may also be provided, as shown. Furthermore, it should be appreciated that, under appropriate circumstances, considering the above-noted issues, providing handlebar systems structured and arranged to operate without a dedicated onboard microprocessor; wherein, a communication system comprising a human interface device, an analog data transmitter (wireless or otherwise), and a mobile device interface is used to communicate key functions such as volume level, music track skipping, etc., from the user to a mobile computing device, wherein within this communication system, the main components serve the following functions; the human interface device may provide options for the user to select and issue the above listed commands; the analog signal transmitter may encode these commands into a wired or wirelessly-transmissible format which may under the appropriate circumstances be carried by an FM carrier signal, an AM carrier signal, an IR/optical signal, or a wired connection; and, the mobile device interface may receive the transmitted analog signal containing the issued commands and may convert these commands into a signal format appropriate for the receiving device, wherein communication ports supported by the mobile device interface may include (but are not limited to) the microphone/headphone jack, the USB power/data connection port, etc., wherein such non-microprocessor-based system arrangements may be achieved.

The handlebar 102 may additionally include a Global Positioning System (GPS) module 162. The GPS module 162 may be configured to receive location data associated with a geographic location of the handlebar 102 and cycle 20. It should be noted that the GPS technology described within the present disclosure may include other GNSS systems, such as, for example, GLONASS, Galileo, Beidou, and other regional systems. The GPS/GNSS module is configured to provide geolocation and time information when the handlebar 102 is in sight of multiple GPS/GNSS satellites 103.

Multiple safety and security features may be incorporated within the handlebar 102. For example, the system may require the user to login with a variety of protocols, such as password, user name plus password, credit card scan or entry, RFID dongle, fingerprint login or other possible accreditation, in order to turn on, in unison, in progression, or in selection, various components within the handlebars. Prior to log in, operation of the components within the handlebars may be limited or disabled. This feature may be particularly useful in the operation of, for example, public bicycle sharing systems and rental cycles. Upon reading this specification, it should be appreciated that, under appropriate circumstances, considering such issues as user preferences, design preference, structural requirements, marketing preferences, cost, available materials, technological advances, etc., other safety and security arrangements such as, for example, utilizing the system to collect use fees via mobile wallet services, logging-in subscriber, monitoring cycle use, enabling the system to broadcast a marker allowing autonomous vehicle functions to identify the location of a rider and implement collision avoidance, if needed, etc., may be sufficient.

The subcomponent housing 108 may include a mobile-device holder 140 fixed to the subcomponent housing 108. The mobile-device holder 140 may be adapted to hold the user's mobile computing device 110 during operation of the cycle 20. The mobile-device holder 140 may include a clamshell hinged cover allowing the user's device to be installed and removed from the subcomponent housing 108. The mobile-device holder 140 may be arranged as a weather-tight enclosure having water-resistant gaskets and seals. Thus, the mobile computing device 110 may be conveniently held and protectively enclosed within the subcomponent housing 108 during use. Upon reading this specification, it should be appreciated that, under appropriate circumstances, considering such issues as user preferences, design preference, structural requirements, marketing preferences, cost, available materials, technological advances, etc., other pairing arrangements such as, for example, providing a cartridge feed assembly configured to slidably receive the mobile computing device within the subcomponent housing, providing cartridge feed assemblies adapted to securely hold a specific brand, model, or type of mobile computing device, providing a power cable within the holding enclosure to supply power from the onboard battery to the user's mobile computing device, etc., may be sufficient.

In some versions of the handlebar system 100, the communication module 152 may further comprise a mobile-device interface module 164, configured to form a paired communication link with at least one mobile-computing device 110. The mobile-device interface module 164 may operate via a wireless connection thus, allowing the handlebar 102 to interoperate with the user's own mobile computing device 110 when placed in the mobile-device holder 140 or located anywhere within wireless signal transmission range. Alternately, the mobile-device interface module 164 may operate via a wired connection. In this arrangement, the mobile-device holder 140 may be equipped with one or more device-compatible cables.

The processor 180 may be configured to execute the executable application 124 upon detection of user interaction with the handlebar system 100. In some embodiments of the present system, the processor 180 may be configured to execute the executable application 124 upon detection of a data-network connectable mobile-computing device 110 within proximity of the handlebar system 100. In this arrangement, a requesting device may be connected once appropriate credentials are determined. This determination may be based on stored information associated with the device or system.

In some applications of the present system, the mobile computing device 110 may be sealed within the mobile-device holder 140 in a semi-permanent manner. By way of example, a bike-rental vendor may secure a computer tablet or similar mobile device within the holding enclosure using tamper-proof fasteners. The cover of the mobile-device holder 140 may include a transparent cover formed from a material compatible with the operation of the touch-screen display panel of the mobile computing device 110. In this arrangement, the mobile computing device 110 may form an interface between the rental customer and the bike-rental vendor. The rental customer may utilize the mobile computing device 110 to complete a rental transaction, receive map and route information, receive music and video content, etc. In some embodiments, the bike-rental vendor may use the system to monitor the location and status of the bike, send and display advertising content, etc. The system may allow for the registering of a recognized or unrecognized smart mobile device in order to gain use of the bicycle. In this arrangement, a user may utilize the network communication capability of the handlebar system to complete a rental transaction via a remote server. Alternately, the handlebar system may be configured to allow the rental transaction to be completed on the user's device via a paired connection with the handlebar system 100. Upon reading this specification, it should be appreciated that, under appropriate circumstances, considering such issues as user preferences, marketing preferences, cost, etc., other system interactions such as, for example, implementing communication between the handlebar system and one or more bicycle rental/storage stations, each station enabling a customer to rent, pickup, and return a bicycle, such stations including a locking mechanism adapted to release the bicycle once a rental has been validated by the system, etc., may be sufficient.

Preferred embodiments of the handlebar system 100 may include one or more sensors 167, which may interoperate with the processor 180 or other onboard features of the system. The sensors 167 may include, but are not limited to, a battery-charge sensor, a tire pressure sensor, a wheel-speed sensor, a crank-speed sensor, an accelerometer, a magnetometer (solid-state compass), a proximity motion sensor, a temperature sensor, an ambient light sensor, a humidity sensor, a biometric sensor (for user authentication), wireless-signal proximity sensor, an audio sensor, etc. Preferred embodiments of the handlebar system 100 may further include a user-monitoring module 144 configured to monitor duration of use, location history, and user data. In addition, embodiments of the handlebar system 100 may include a security notification module 146 configured to report unauthorized use of the cycle 20 to which the apparatus is mounted. These security features may include one or more sensors, an alarm, and may interoperate with the processor 180 and onboard GPS module 162 to identify unauthorized movement or use of the cycle 20.

The system may be configured to communicate with a software application (i.e., App 187) installed on the user's mobile device. In this manner, the user or monitoring entity may be alerted to any unauthorized tampering or movement of the cycle 20. Alternately, the executable application 124 may include security codes or linkages, configured to interoperate with the "built-in" devices (e.g., handlebar phone/tablet/device). Such codes or linkages may include pin codes, "credit card authorization", physical keys, RFID identification, near-field communication, biometric fingerprint or retinal identification, verified user identification, private and/or public keys etc. The codes or linkages may be configured to control the onboard peripherals including the operation of items such as, cameras, system lock downs, and "physical lock engagements" installed in the cycle 20 or interoperating with the cycle. The code may be designed to utilize the speaker upon detection of unauthorized movement of the cycle 20 (e.g., sounding an alarm or play a prerecorded message annunciating that "this bike has been stolen", etc.)

Additionally, the handlebar 102 may further include an image-capture module 126 (such as a camera) configured to capture and store images. The image-capture module 126 may be configured to be controllable via the user interface 150 and/or by the mobile computing device 110 via the docked connection. The image-capture module 126 may be adapted to provide both still and motion-video-capture capability. As noted above, this feature permits users to record their rides for documentation, information, safety, etc. The system is further adapted to provide video feed, both live from the camera(s), transmitted, projected by a smart device computer, etc. For example, users in a biking competition or training are able to record their ride and have a monitor or coach identify incorrect techniques and effectively improve on their race times and general performance. Remote access to live video can be used for athletic evaluation, for security reasons, such as when a bike has been stolen. A user of a stolen bike may remotely acquire video and location information from their missing bike. Video data may be used by police and other individuals to interface with their team and to either send or receive important video or data streams. A general user may continuously record a ride in order to document the trip and environment around them. The image-capture module 126 may include multiple video-capture elements 136, as shown. Furthermore, the image-capture module 126 may be adapted to process video feeds from the multiple video-capture elements in real time. Thus, bicycle or motorcycle police may implement continuous and comprehensive video acquisition procedures.

Referring again to FIG. 2 and FIG. 3, the subcomponent housing 108 may include a set of modular receivers 182 to permit a user to select and attach, either physically or with network technology, a set of ancillary devices and components. More specifically, the subcomponent housing 108 may be outfitted as a platform for a variety of accessories 184 that may be installed within the handlebars, thus allowing the user to customize the handlebar, as needed. Such accessories 184 may include video-capture elements 136 (cameras), lights 186, telescoping and retractable booms 188 (to support the cameras), GPS modules (reporting time and place), credit-card readers, communication interfaces adapted to interoperate with "smart helmets" and other smart devices, sensors, etc. It is noted that the accessories 184 may be designed with low profiles and rounded shapes to reduce aerodynamic drag. It should also be noted that any of the depicted modular accessories 184 may be permanently within the housing assembly, as illustrated by the light 186 shown in in FIG. 6.

Referring again to FIG. 1, the cross-member 120 of embodiments of the handlebar system 100, may include a mounting stem 224 configured to assist in mounting the embodiment to the steering headset 225 of the cycle 20. The mounting stem 224 may include a quick release feature 154 configured to enable quick release of the mounting stem 224 from a steering headset 225 of the cycle 20, or a quick release of the handlebar from the mounting stem. The quick release feature 154 can be used in the following ways but not limited to detachment removal and reattachment of the full handlebar system from the stem or headset of the cycle 20. The quick release feature 154 is configured to disconnect both the structural handlebar as well as release mechanisms of the controlling mechanical and electronic cables that communicate to other aspects of the cycle, including but not limited to features such as brakes, transmission, speed controls, battery and motor connections and controllers.

It is noted that the function of the quick release feature 154 may extend to detachment, removal, and reattachment of the component elements inside the handlebar 102, including, but not limited to computing elements, batteries, and modular elements held in both cartridge feed and modular mounting elements. This device mechanism (quick release and/or attachment feature) may be used to enhance security and may create easy access to apps, data, information, components, devices, etc., thus allowing for easy access should future repairs and upgrades to the components and mechanism within the handlebar system 100 be needed or desired.

Figure 5:
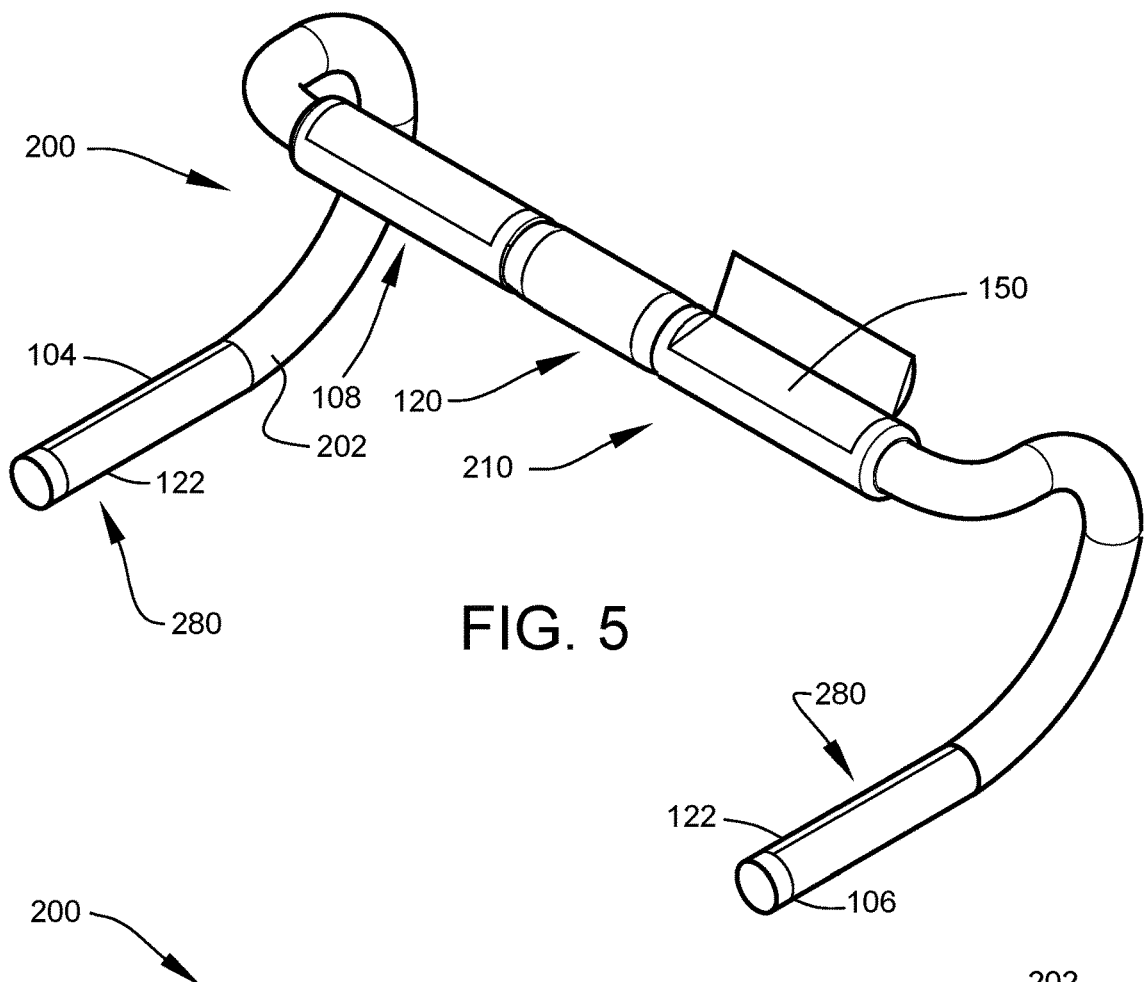
FIG. 5 is a perspective view of the handlebar system, according to an alternate embodiment of the present disclosure.
Figure 6:
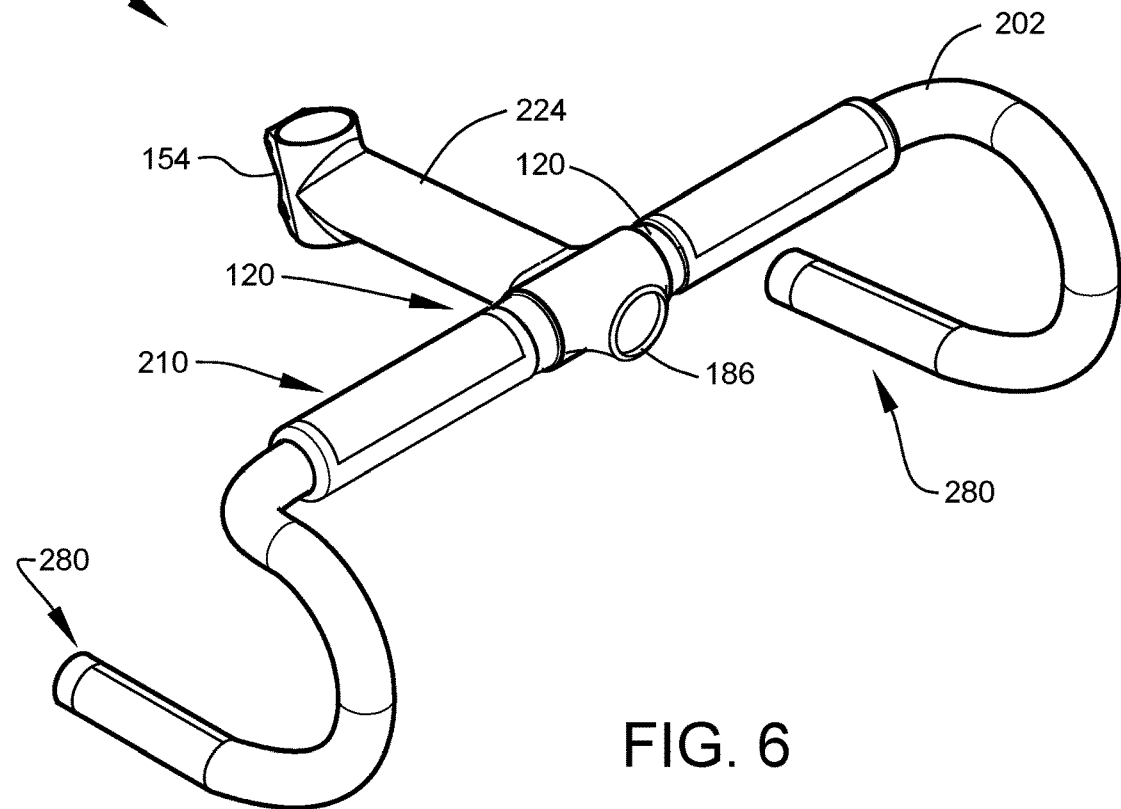
FIG. 6 is a perspective view of the handlebar system of FIG. 5.

As noted above, some embodiments of the presently disclosed system are arranged such that the computer and communication functions are permanently within the handlebar element. FIG. 5 is a front perspective view illustrating an alternate handlebar 200 having the functions of a mobile computing device permanently within the handlebar. FIG. 6 is a rear perspective view of the handlebar 200 of FIG. 5, according to an embodiment of the handlebar system 100. In the depicted alternate handlebar 200, the subcomponent housing 108 may be modeled after the shape of a traditional cycle handlebar, as shown. Alternately, the alternate handlebar 200 may be shaped in manner similar to the handlebar 102 of FIG. 1.

Referring again to FIG. 4, any functional combination the subcomponents illustrated in FIG. 4 may be permanently within the subcomponent housing 108. In this alternate arrangement, the user is not required to carry their own mobile computing device 110, as the functions of such a device are permanently embedded within the handlebar.

It is noted that the alternate handlebar 200 may be configured to wireles sly communicate with at least one other remote device 132 via a wireless link to at least one wireless communication network 134. Such networks may include cellular networks, W-Fi networks, satellite networks, Bluetooth networks, networks using CAN bus protocols, ANT networks, FM networks, and the like. Such cellular and mobile networks may include, but are not limited to, Global System for Mobile Communication (GSM), Universal Mobile Telecommunications System (UMTS/3G), Code-division multiple access (CDMA), Long-Term Evolution (LTE), IMT Multi-Carrier (IMT-MC), etc. This feature allows the user to, for example, make phone calls, download music, receive news updates, upload video content, process data streams from the cycle, etc. The remote device 132 may include one or more servers, which may send and receive data and may provide smart-device applications for download. Such servers may be arranged to allow users to register and obtain an account linked to their handlebar system and/or smart mobile device. Upon reading this specification, it should be appreciated that, under appropriate circumstances, considering such issues as user preferences, design preference, technological advances, etc., other network arrangements such as, for example, utilizing other network protocols, as of yet developed networks, etc., may be sufficient.

The handlebar 102 may further include an audio-signal processing module 138 configured to process audio signals received from and sent to the mobile computing device 110. This added feature is configured to provide music and audio capability allowing cyclists and motorcycle riders to listen to music as they ride. Audio may also be important for police, either in speaking with their station, or in connecting to a loudspeaker effectively functioning as a bullhorn device. When the handlebar 102 is configured for special-purpose police use, the handlebar 102 may include red and blue flashing lights, sirens, police-specific communication devices, cameras for collecting and recording video data, etc. It is noted that the law-enforcement versions may not be equipped with a cellular-communication component; rather, the law-enforcement versions may use conventional radio technology operating within any frequencies used by law enforcement entities, such as, for example, dedicated FM, VHF, or UHF police bands.

The audio-signal processing module 138 may include a DAC (Digital-to-Analog Converter) adapted to convert digital audio information into an analog audio signal that can be sent to the speaker 112. The audio-signal processing module 138 may also include an amplification feature to amplify the audio signal sent to the speaker 112. In some versions of the present system, the audio-signal processing module 138 may be incorporated within the processor 180, as shown. Moreover, the audio-signal processing module 138 may be adapted to process audio signals received by the microphone 114. Those with ordinary skill in the art will now appreciate that upon reading this specification and by their understanding the art of audio processing as described herein, methods of implementing such devices will be understood by those knowledgeable in such art.

FIG. 7 is a detail view of a user interface 150 of the alternate handlebar 200 of FIG. 5, according to an embodiment of the present disclosure. A basic user interface 150 may include radio selector buttons 202, web-based music access buttons 204, adapter control buttons 206 to download music, and data/power access ports 208, among others. The user interface 150 may be protected by a hinged cover 210, as shown. Onboard power may be provided by or supplemented by a photovoltaic panel 133, as shown. Additional power may be provided by other solar cell mounted to the bike.

Figure 8:
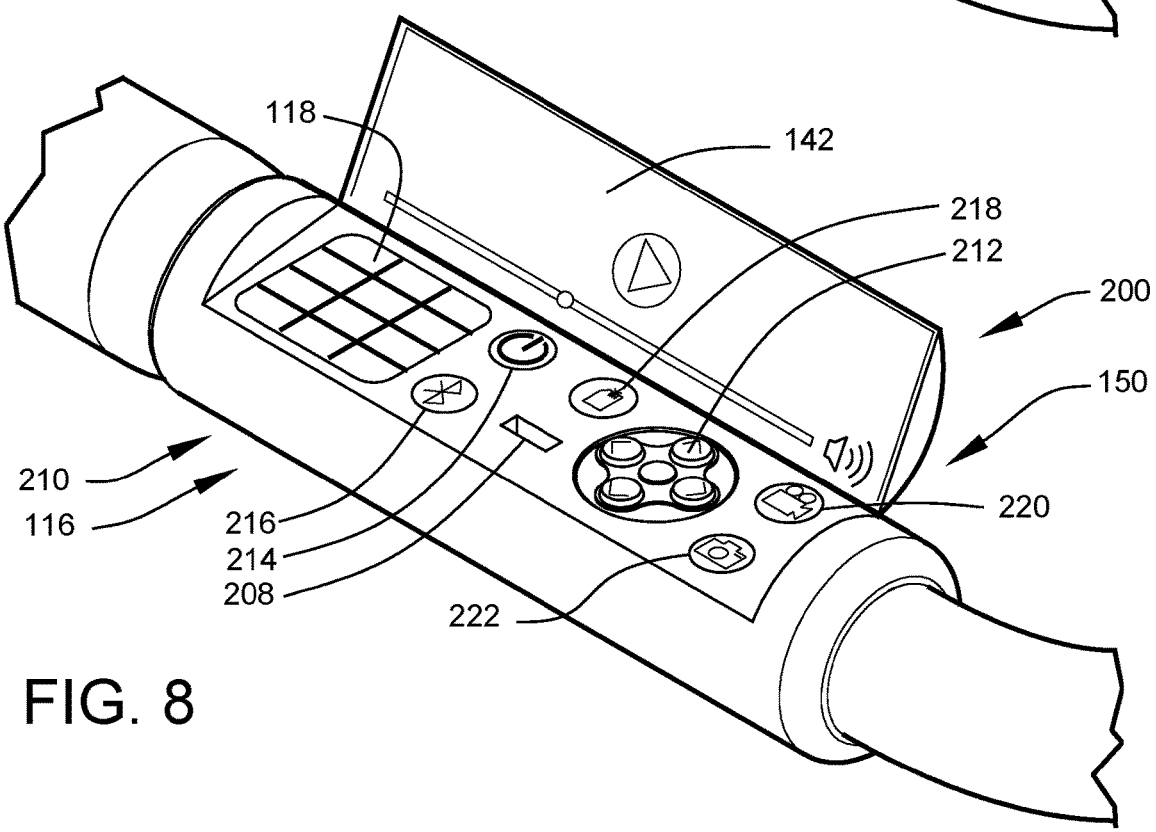
FIG. 8 is a detail view of an alternate user interface of the handlebar system of FIG. 5, according to an embodiment of the present disclosure.

FIG. 8 is a detail view of an alternate user interface 150 of the alternate handlebar 200 of FIG. 5, according to an embodiment of the present disclosure. The manual input 116 of the mobile computing device 110 may include an alphanumeric keyboard 118, as shown. The alphanumeric keyboard 118 may be used to make out-going phone calls, input password for login protection, manually adjust volume, input credit card numbers, etc. In some embodiments, the manual input 116 may include a "911" emergency-call button adapted to initiate the transmission of an emergency response request. A key could be programmed to initiate instant on recording of audio and video. A separate module may be provided to take credit cards for rental usage for instance.

Versions of the mobile computing device 110 may further include a visual-display module 142 configured to display images. The visual-display module 142 may be used to display phone information, text, graphics, still camera images, and video. In some embodiments of the handlebar system 100, the visual-display module 142 may include a touch-enabled surface configured to generate a signal corresponding to a touched location within the touch-enabled surface. In other embodiments of the system, the touch-enabled surface may be used to implement the alphanumeric keyboard 118. Rear-view imagery (to see approaching traffic from behind) as well as near and far vehicle identification could also be shown on screen.

In some embodiments of the handlebar system 100, the visual-display module 142 may be coupled to a television receiver adapted to receive and process an over-the-air TV signal. Over-the-air television is a term used to describe television signals that are broadcast by a local television broadcast tower (as opposed to a cable or satellite signal). For example, the handlebar system 100 may be adapted to receive and process digital high-definition television (HDTV) in the United States. This feature allows HDTV content to be displayed on the system without the need for a subscription or monthly fees.

The user interface 150 of FIG. 8 may also include programmable buttons 212 to allow the user to control the tilt, pan, zoom, and focus, of the onboard cameras. The user interface 150 of FIG. 8 may also include an on-off buttons 214, Bluetooth buttons 216, file transfer buttons 218, video capture buttons 220, and camera mode buttons 222, as shown. The user interface 150 of FIG. 8 may interoperate with one or more Apps 187 (i.e., software applications) to download and save, share the user's videos, and pictures from the user's ride.

It is noted that the embodiment of FIG. 1 may also include a dedicated mobile computing device 110 permanently or removably installed within the subcomponent housing 108. In this alternate arrangement, the subcomponent housing 108 may be structured and arranged to receive a mainboard or motherboard 302 containing the processor 180, memory 170, and system modules supporting mobile-phone-communication capability. The handlebar system may be equipped with a micro heat-pipe/plate, thermal-cycle condenser, exchanger, or similar cooler technology to cool and lower the temperature of the handlebar electronic components and to adjust the temperature comfort of the riders interface, warming the handlebars for instance in the winter and cooling them in the summer. A dedicated touch-screen display panel 300 may also be provided, as shown.

Referring again to FIG. 3 and FIG. 6, the cross-member 120 of embodiments of the handlebar system 100, may include a mounting stem 224 configured to assist in mounting the embodiment to the steering headset 225 of the cycle 20 (see FIG. 1). The mounting stem 224 may include a quick release feature 154 configured to enable quick release of the mounting stem 224 from a steering headset 225 of the cycle 20, or a quick release of the handlebar from the mounting stem. The quick release feature 154 may be of a standard cam-type design having manually operable levers, threaded fasteners, etc. for the locking and releasing of the steering headset 225. Threaded fasteners can be locked under access plates making the handlebar more secure against theft. As previously noted, the quick release may also include quick release of cables.

According to one embodiment, the device may be arranged as a kit 158, as illustrated in FIG. 3. The kit 158 may include a set of instructions 156, as shown. The instructions 156 may detail functional relationships in relation to the structure of the embodiment of the system (such that the embodiment can be used, maintained, or the like, in a preferred manner). The kit 158 may also contain one or more of the accessories 184 shown in FIG. 2. Upon reading this specification, it should be appreciated that, under appropriate circumstances, considering such issues as user preferences, design preference, structural requirements, marketing preferences, cost, available materials, technological advances, etc., other kit arrangements such as, for example, including mounting hardware, tools, rear view mirrors (or video displays), locks, antennae, credit-card readers, the cycle, etc., may be sufficient.

Figure 9:
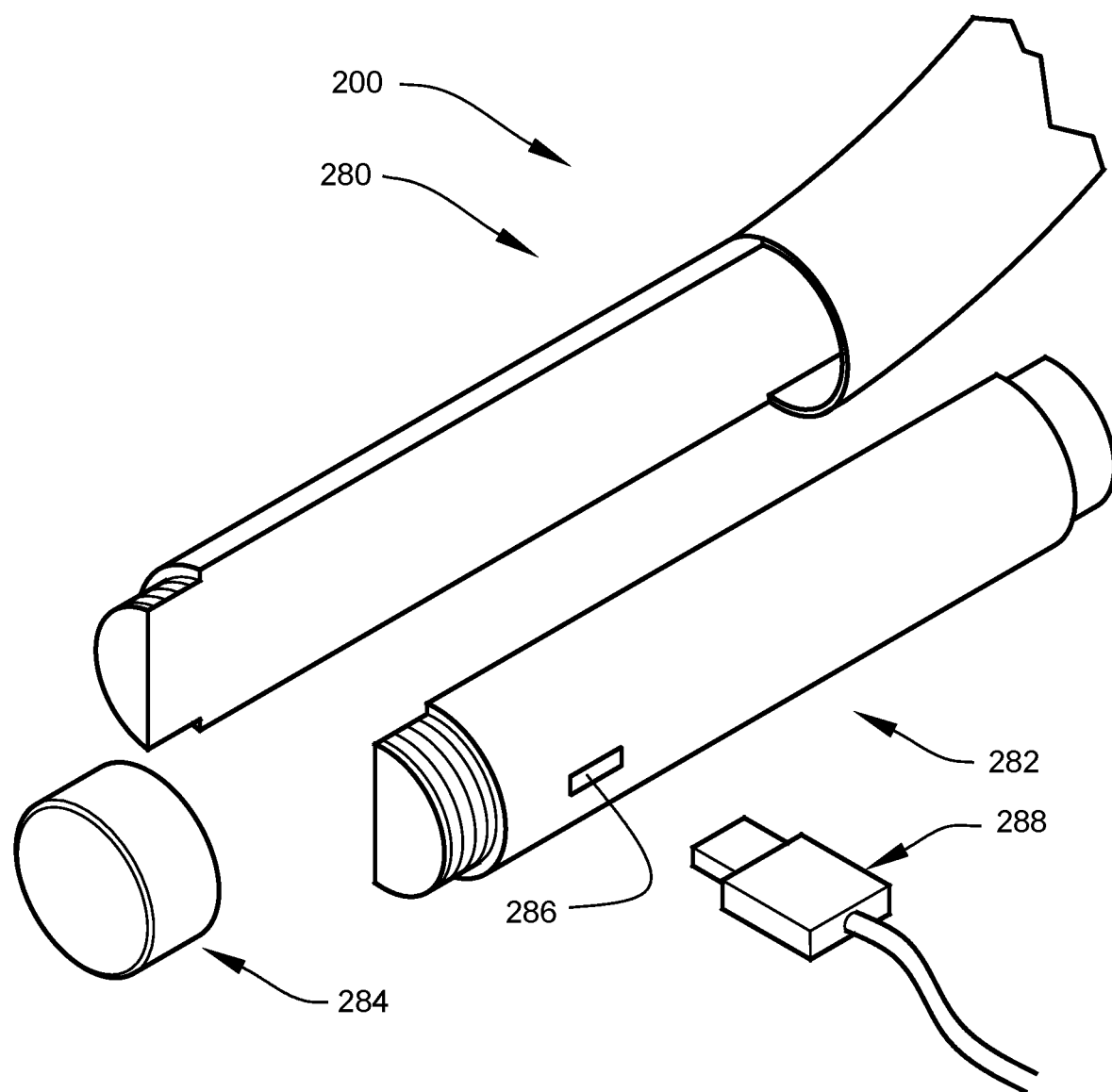
FIG. 9 is an exploded view of an alternate set of hand grips incorporating a removable battery pack of the handlebar system of FIG. 5, according to an embodiment of the present disclosure.

FIG. 9 is a detail view of an alternate set of hand grips 280 of the alternate handlebar of FIG. 5. The alternate hand grips 280 may incorporate the energy storage module 130 in the form of a removable battery pack 282, as shown. The removable battery pack 282 may include a portion of the hand grips 280 held in place by a threaded retainer 284, as shown. The battery pack 282 may include a charge port 286 allowing the battery pack 282 to be recharged via a charge cable 288. The charge port 286 may also be designed to supply power to the rider's compatible accessories.

Figure 10:
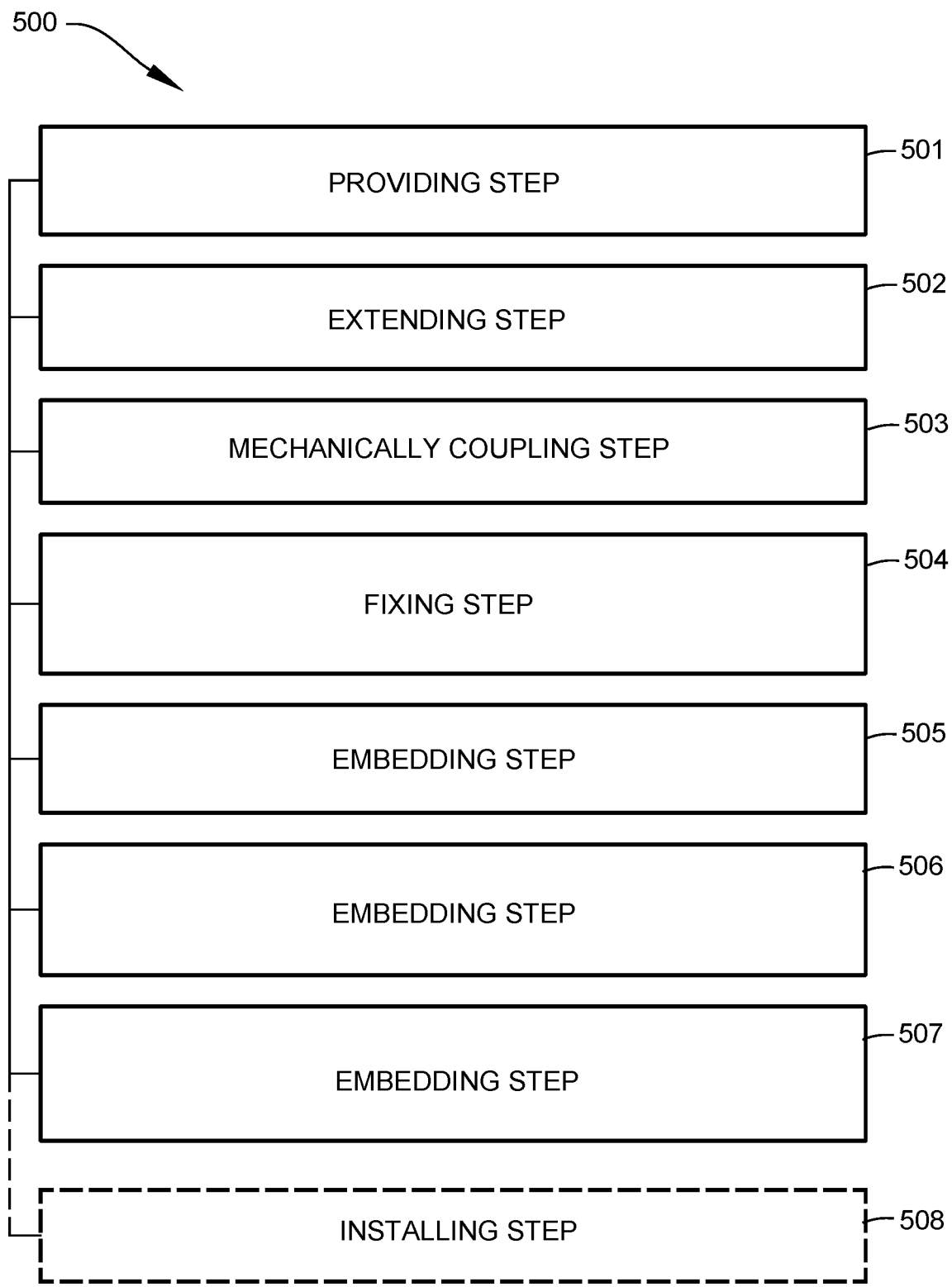
FIG. 10 is a flow diagram illustrating a method of use for handlebar system, according to an embodiment of the present disclosure.

FIG. 10 is a flow diagram illustrating a handlebar method 500, according to an embodiment of the present disclosure. As illustrated, the handlebar method 500 may include the steps of: step one 501, providing a handlebar 102 configured to attach to and steer the cycle, the handlebar having a left hand end and a right hand end; step two 502, extending a cross-member 120 between the left hand end and right hand end, the cross-member including a subcomponent housing; step three 503, mechanically coupling an energy storage module to the subcomponent housing; step four 504, fixing a user interface 150 to the subcomponent housing, said user interface including a speaker, a microphone, and at least one manual input, said user interface adapted to communicate a command from the user; step five 505, embedding a communication module in the subcomponent housing, said communication module including a transceiver electrically coupled to the energy storage module, said transceiver configured to wirelessly communicate with at least one external communication network; step six 506, embedding a memory 170 in the subcomponent housing, said memory electrically coupled to the energy storage module, said memory configured to store an executable application, the executable application operable to communicably couple the communication module with at least one external communication network via the transceiver and establish a communication link there between, and provide for interoperation of the communication module and the user interface; and step seven 507, embedding a processor in the subcomponent housing, said processor electrically coupled to the energy storage, and communicably coupled to the communication module, the memory, and the user interface, said processor configured to execute the executable application upon detection of user interaction with said handlebar system. Furthermore, the handlebar method of use 500 further may include, step 508 of installing the handlebar 22 on the cycle 20.

It should be noted that step 508 is an optional step and may not be implemented in all cases. Optional steps of method 500 are illustrated using dotted lines in FIG. 10 so as to distinguish them from the other steps of method 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for the system (e.g., different step orders within above-mentioned list, elimination or addition of certain steps, including or excluding certain maintenance steps, etc.), are taught herein.

Figure 11:
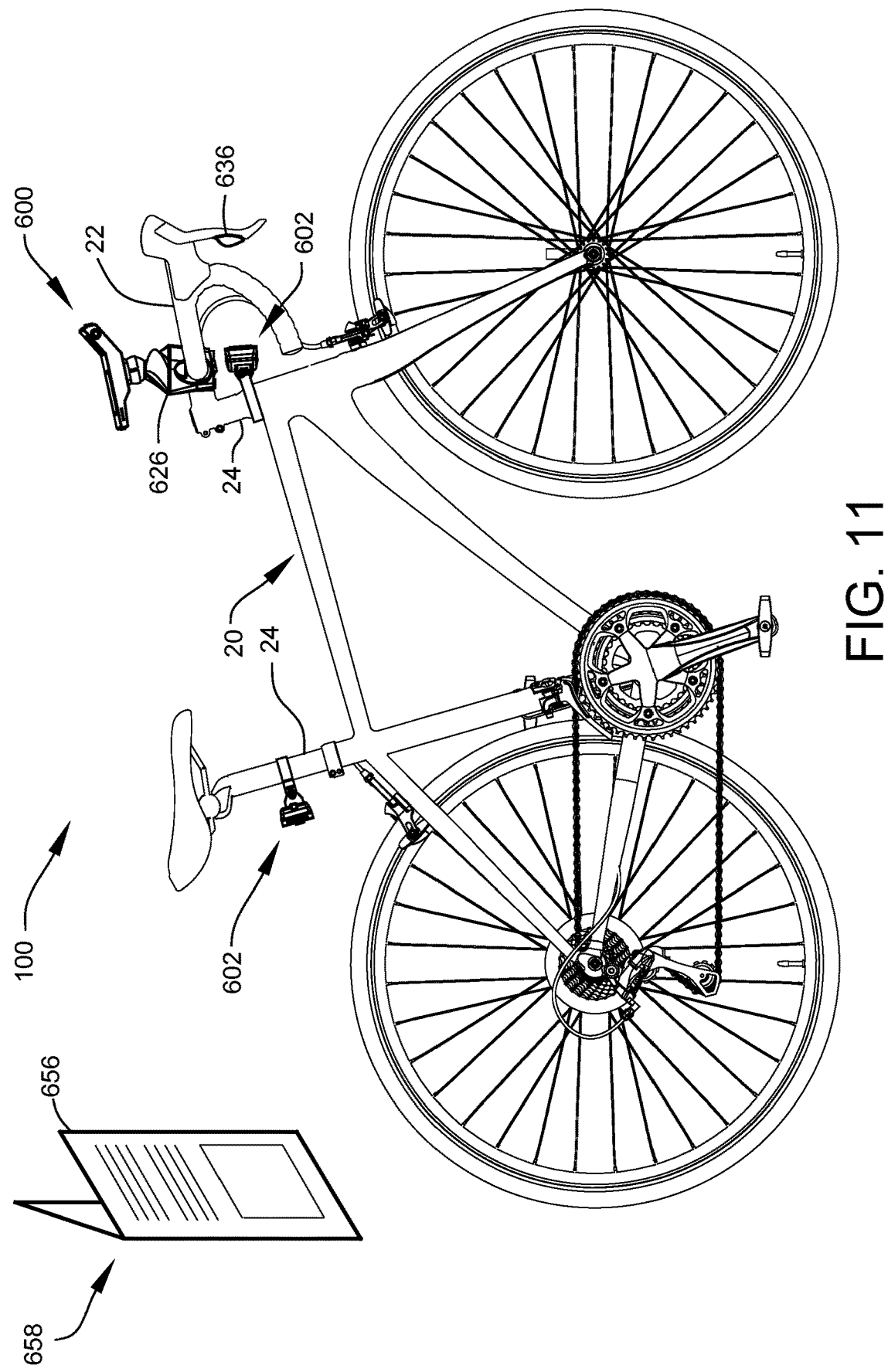
FIG. 11 is a side view of a handlebar-mountable unit and frame-mountable accessories of the handlebar system during an "in-use" condition, according to alternate embodiments of the present disclosure.

FIG. 11 is a side view of a handlebar-mountable unit 600 and frame-mountable accessories 602 of the handlebar system 100, according to alternate embodiments of the present disclosure. FIG. 11 shows the handlebar-mountable unit 600 and frame-mountable accessories 602 during an "in-use" condition, wherein the devices are respectively mounted to the existing handlebar 22 and existing frame portion 24 of a cycle 20.

Figure 12:
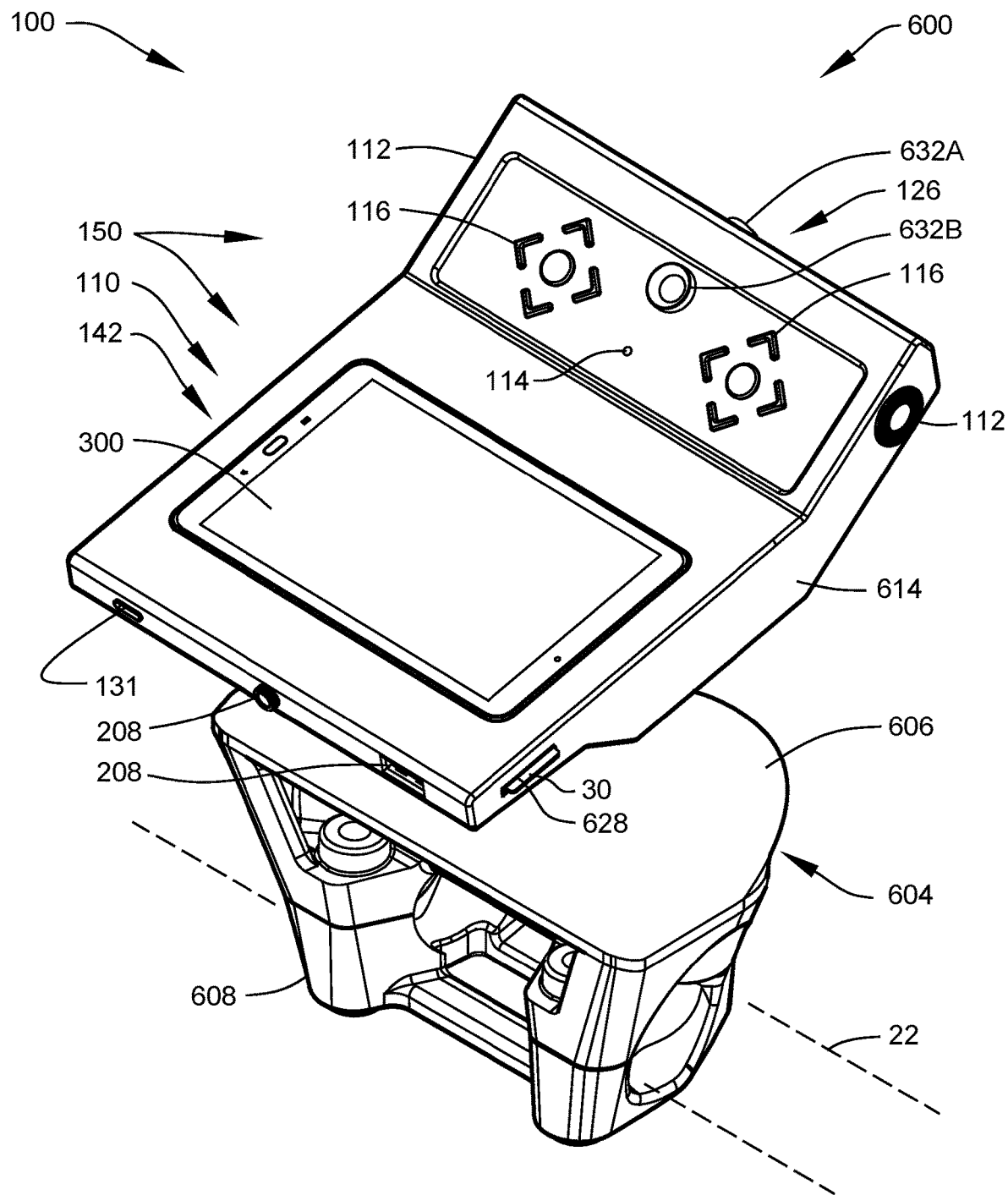
FIG. 12 is a front perspective view of the handlebar-mountable unit, according to the alternate embodiment of FIG. 11.
Figure 13:
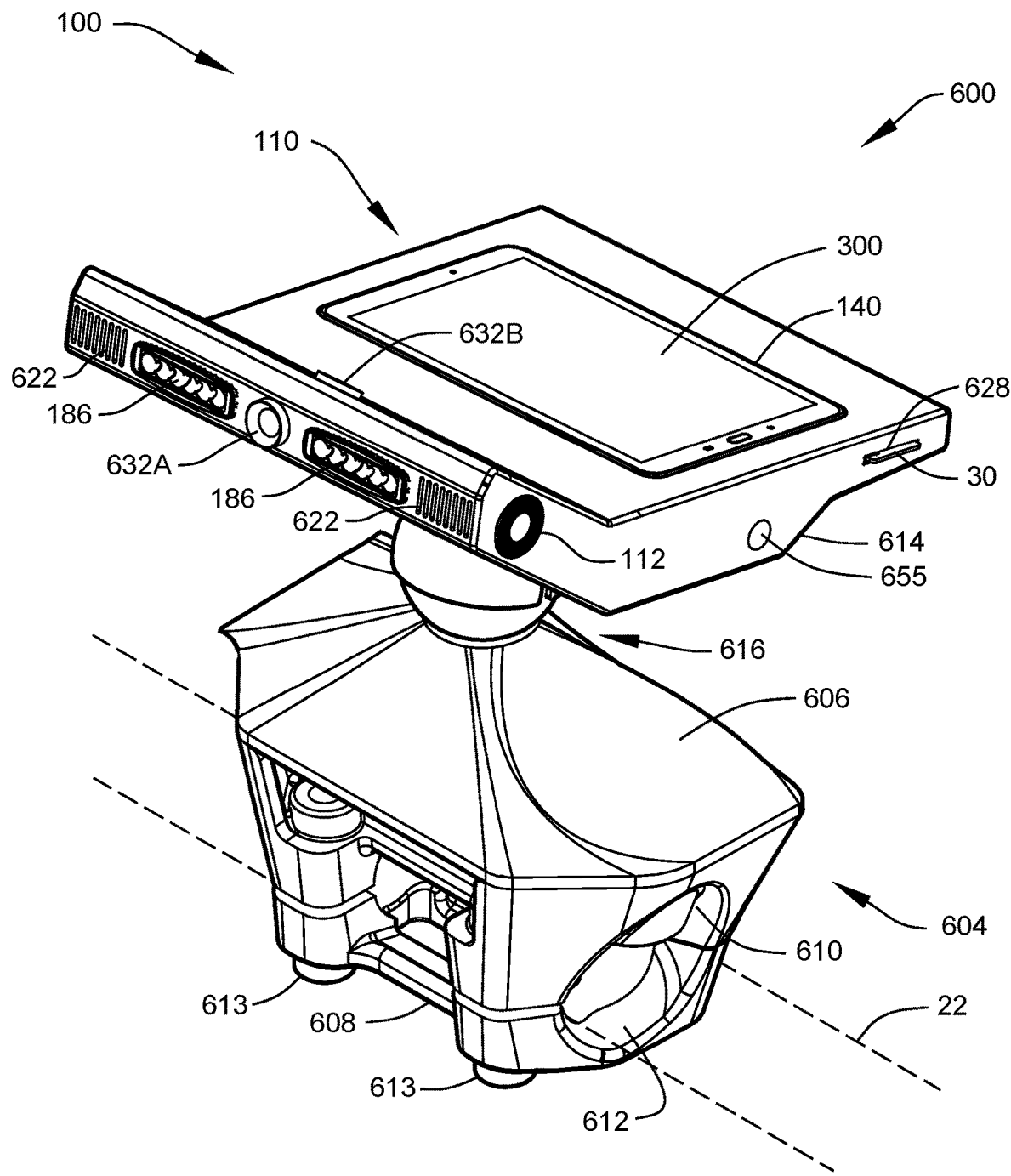
FIG. 13 is a rear perspective view of the handlebar-mountable unit, according to the alternate embodiment of FIG. 11.
Figure 14:
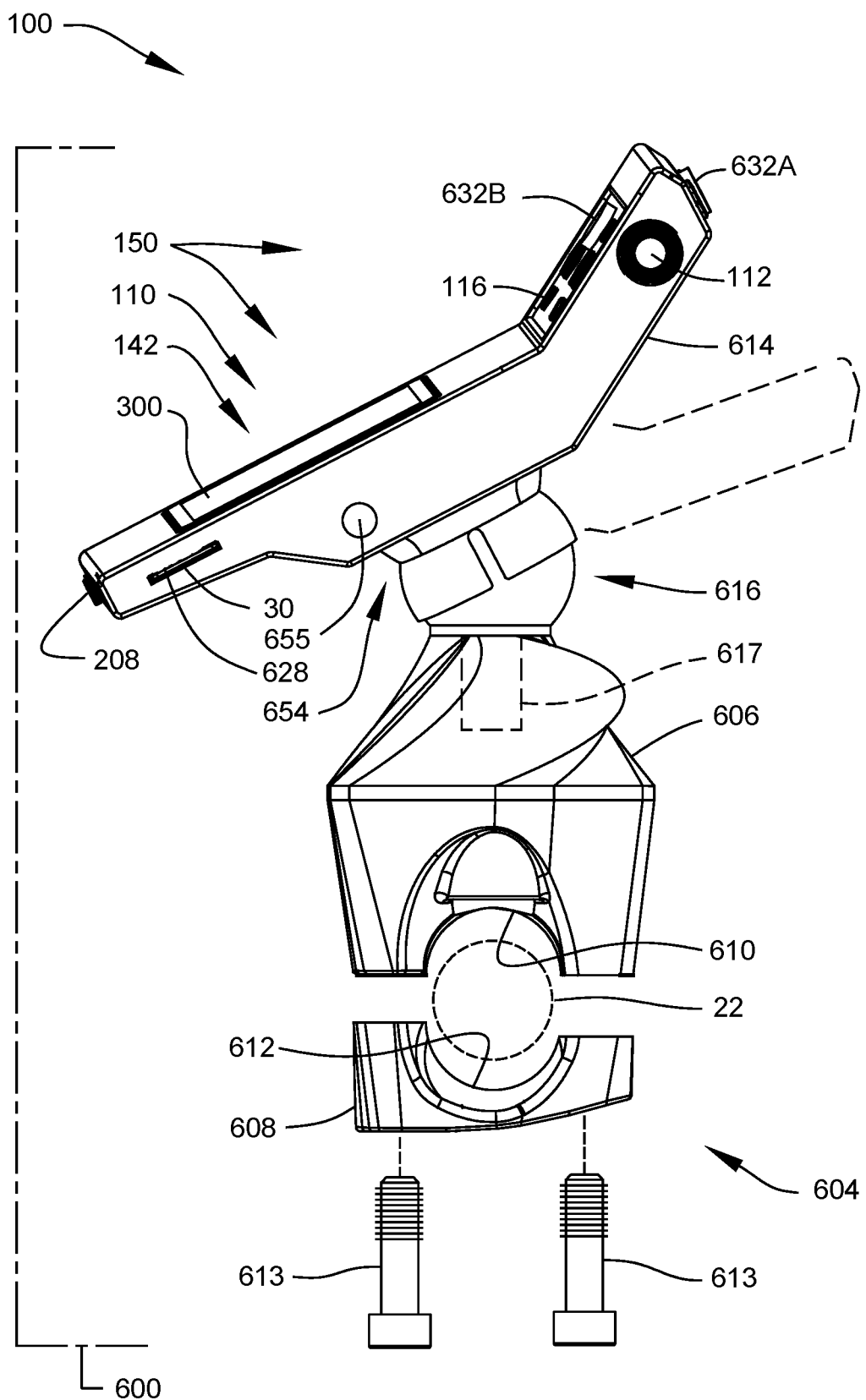
FIG. 14 is a side view of the handlebar-mountable unit, according to the alternate embodiment of FIG. 11.
Figure 15:
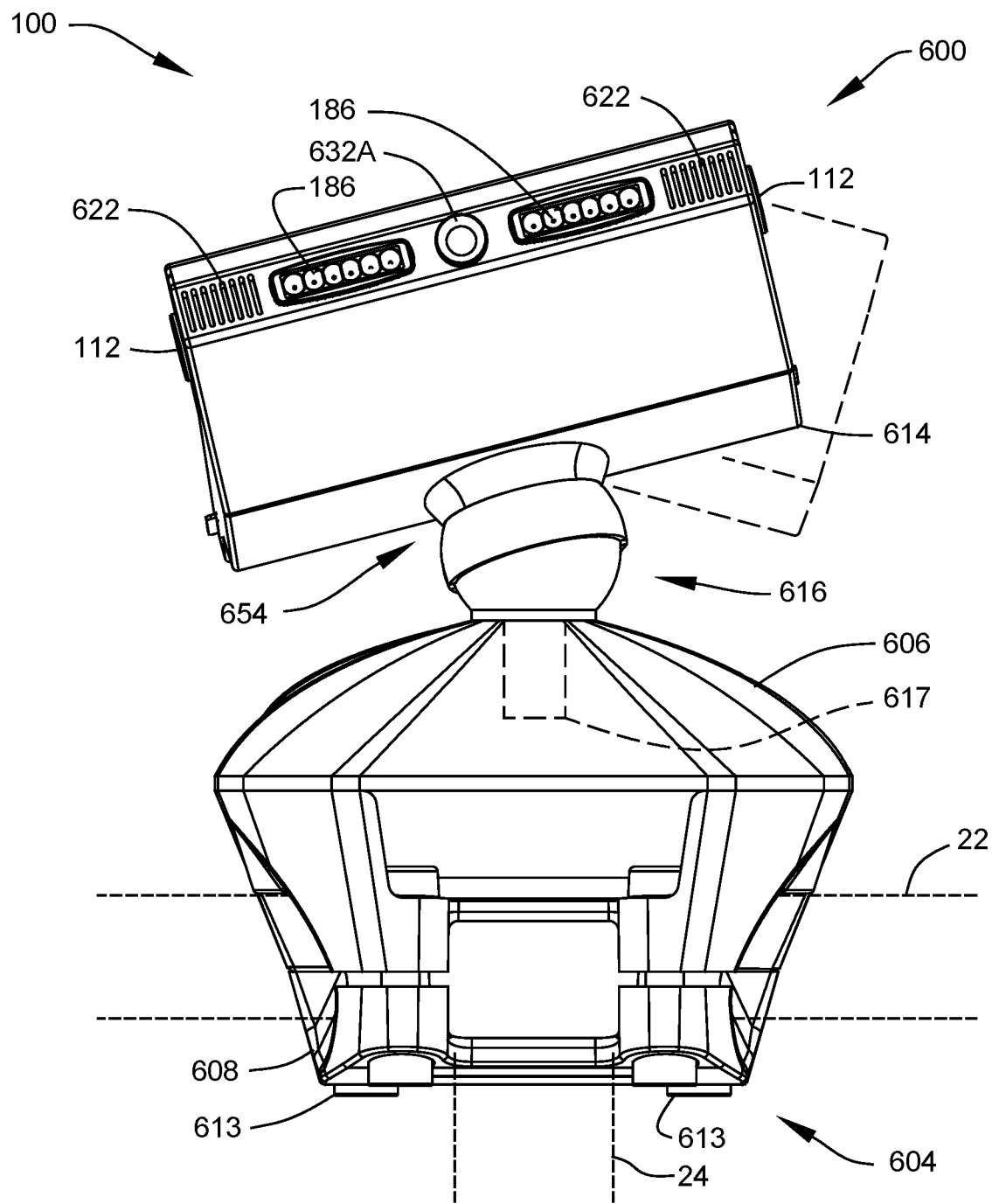
FIG. 15 is a rear view of the handlebar-mountable unit, according to the alternate embodiment of FIG. 11.

FIG. 12 is a front perspective view of the handlebar-mountable unit 600, according to the alternate embodiment of FIG. 11. FIG. 13 is a rear perspective view of the handlebar-mountable unit 600, according to the alternate embodiment of FIG. 11. FIG. 14 is a side view of the handlebar-mountable unit 600, according to the alternate embodiment of FIG. 11. FIG. 15 is a rear view of the handlebar-mountable unit 600, according to the alternate embodiment of FIG. 11. Reference is now made to the illustrations of FIG. 11 through FIG. 15, with continued reference to the diagram of FIG. 4. It is noted that the functions and features the handlebar-mountable unit 600 are substantially similar to those of the handlebar 102 of FIG. 1; therefore, only the differences will be described below. The same or similar elements and comparable arrangements are provided with the same reference numerals in the drawings.

A primary difference between the handlebar-mountable unit 600 and the prior handlebar 102 of FIG. 1 is that the subcomponent housing 614 of the handlebar-mountable unit 600 omits the integrated handlebar of the prior-described embodiment. In place of the integrated handlebar, the handlebar-mountable unit 600 includes a universal mount 604 enabling a user to removably-attach the handlebar-mountable unit 600 to an existing handlebar 22 of the cycle 20, as shown.

The universal mount 604 may include a clamping assembly adapted to frictionally clamp to the handlebar 22. The clamping assembly may include a first coupling member 606 and a second coupling member 608, as shown. The first coupling member 606 and the second coupling member 608 are each provided with a generally concave receiving portion 610, 612 respectively for receiving the handlebar 22 there between. The first coupling member 606 and the second coupling member 608 may be operably connected together by a set of threaded bolts 613. When the first coupling member 606 and the second coupling member 608 are positioned over the handlebar 22, tightening the bolts 613 has the effect of clamping the universal mount 604 to the handlebar 22. Loosening the bolts 613 allows the position of the universal mount 604 and handlebar-mountable unit 600 to be adjusted or allows the device to be fully removed from the handlebar 22. Upon reading this specification, it should be appreciated that, under appropriate circumstances, considering such issues as user preferences, design preference, marketing preferences, cost, available materials, technological advances, etc., other mount arrangements such as, for example, providing clamp assemblies adjustable in both width and length to fit and hold the system to a range handlebar/bike configurations, etc., may suffice.

The first coupling member 606 may further include an adjustable ball-head assembly 616 to allow the angular and rotational position of the subcomponent housing 614 to be adjustable relative to the handlebar 22. A user is able to set a position of the handlebar-mountable unit 600 to any selected rotational and angular position within a range of motion allowed by the shape of the joint components. The dashed-line depictions of FIG. 14 and FIG. 15 illustrates examples of the angular adjustability afforded by the ball-head assembly 616. The ball of ball-head assembly 616 is captured within a receiving cup to prevent the separation of the assembly during adjustment.

The adjustable ball-head assembly 616 may further include a quick release feature 654 configured to enable quick release of the subcomponent housing 614 of the handlebar-mountable unit 600 from the handlebar 22. The quick release feature 654 allows the user to remove and transport the system to a location away from the cycle 20. This allows the user to securely store the unit, to watch a video or review photos in another location, to play a video game, to allow the system to recharge in the user's home, a restaurant, etc. In the case of units adapted to a law-enforcement function, the quick release feature 654 allows an officer to write police reports, perform business work, or otherwise interact with the unit in a location away from the cycle 20. The quick release feature 654 may include a locking release button 655 that allows release of the subcomponent housing 614 from the adjustable ball-head assembly 616 when depressed. Those with ordinary skill in the art will now appreciate that upon reading this specification and by their understanding the art of mechanical quick-release assemblies as described herein, methods of implementing such quick-release arrangements will be understood by those knowledgeable in such art.

The adjustable ball-head assembly 616 may also include a vertical adjustment assembly 617 to allow the position of the subcomponent housing 614 to be adjustable up and down relative to the handlebar 22. The vertical adjustment assembly 617 may include a shaft adjustably-engaged within a receiving bore of the first coupling member 606. Upon reading this specification, it should be appreciated that, under appropriate circumstances, considering such issues as user preferences, design preference, structural requirements, marketing preferences, cost, available materials, technological advances, etc., other adjustment arrangements such as, for example, providing a positional lock to allow the user to lock a handlebar-mountable unit in a selected position, utilizing a flexible support arm to adjustably fix the position of a handlebar-mountable unit, utilizing an articulated arm with multiple joints, etc., may be sufficient.

As above, the handlebar-mountable unit 600 of the handlebar system 100 may provide communication features permitting cyclists or bikers to safely and conveniently establish a real-time communication link with remote individuals or network sites while riding. This includes sending or receiving phone calls during operation of the cycle 20. As above, the handlebar-mountable unit 600 may include a set of subcomponents functioning to allow the user to connect and communicate via voice, data and radio networks, supporting messaging and data signaling person to person, vehicle to vehicle, GPS transmission and reception, as well as vehicular data streams between the handlebar system and other local devices. Embodiments of the presently disclosed system may be configured interoperate with the Internet of things (IoT), which is the network of physical devices, vehicles, smart devices, and other items embedded with electronics, software, sensors, actuators, and network connectivity that enable these objects to connect and exchange data. Embodiments of the presently disclosed system are further designed to provide a communication link to a user's personal phone and/or smart device engaged within the handlebar-mountable unit 600 or located in near proximity.

Referring again to the prior diagram of FIG. 4 and with continued reference to FIG. 11 through FIG. 15, the alternate subcomponent housing 614 of the handlebar-mountable unit 600 may house many or all of the same subcomponents as those of the prior handlebar 102. These subcomponent combinations may be arranged in the same or similar functional arrangements, as noted above. In particular, the subcomponent housing 614 of handlebar-mountable unit 600 may house energy storage modules 130, mobile computing devices 110, speakers 112, microphones 114, manual inputs 116, executable applications 124, image-capture modules 126 (cameras), wireless connections 128, energy storage modules 130, video-capture elements 136, audio-signal processing modules 138, docking modules 140, visual-display modules 142, user interfaces 150, and data/power access ports 208, lights 186. The handlebar-mountable unit 600 may further include the same or similar user-monitoring modules 144, security notification modules 146, and cartridge feed assemblies 148 of the prior embodiment.

The lights 186 may be located on the front subcomponent housing 614 so that they may function as forward-illuminating headlights.

As above, the energy storage module 130 may be in the form of an on-board battery pack, or other compact power supply. The energy storage module 130 may be located within the subcomponent housing 614 and may allow the user to recharge the system via rechargeable batteries, which may be located in the subcomponent housing 614, in the handlebar, or in other parts of the cycle 20. In one embodiment of the system, the energy storage module 130 is supplied as a battery (cell or battery pack), which may be mechanically coupled to the subcomponent housing 614. Both the housing and the removable battery pack may include a charge port 131 to enable charging of the energy storage module 130 without removal of the battery from the housing.

As above, the communication module 152 may be fixed to the subcomponent housing 614 and electrically coupled to the energy storage module 130. The communication module 152 may include a transceiver 160 configured to wireles sly communicate with a wireless communication network 134, a local wireless device, or both. The transceiver 160 may be adapted to communicably couple with the external communication entities via at least one wireless connection 128. Such networks and may include cellular networks, W-Fi networks, satellite networks, Bluetooth networks, networks using CAN bus protocols, ANT networks, FM networks, and the like.

The user interface 150 may be fixed to the subcomponent housing 614. As above, the user interface 150 may include speakers 112, microphones 114, and at least one manual input 116. The user interface 150 may be adapted to communicate a command from the user; for example, the user interface 150 may be used to control the speaker volume, receive text or voice data, or may be used to remotely control a user's mobile computing device 110. In some embodiments, the system is configured to operate using voice commands. As above, mobile computing devices contemplated for use with the present system may include; cell phones, smart phones, laptops, notebooks, tablet/slate PCs, netbooks, and the like.

The memory 170 may be embedded in the subcomponent housing 614 and may be electrically coupled to the energy storage module 130. The addressable memory 170 may be configured to store an executable application 124 operable to communicably couple the communication module 152 with the external wireless communication network 134 (or local wireless device) via the transceiver 160 and establish a full duplex communication link therebetween. Furthermore, the executable application 124 may enable interoperation of the communication module 152 and the user interface 150. The memory 170 may include one or more digital memory devices (e.g., fixed and removable cards, chips, drives, etc.) and may include other local networked storage devices.

As above, the handlebar-mountable unit 600 may include a processor 180 embedded in the subcomponent housing 614. The processor 180 may be electrically coupled to the energy storage module 130, and communicably coupled to the communication module 152, the memory 170, the user interface 150, and storage memory residing in the card slot 628. The processor 180 may be configured to execute the executable application 124 upon detection of user interaction with the handlebar system 100. One embodiment, accordingly, provides for the processor 180 to be mounted to a mainboard or motherboard 302, as shown. The motherboard 302 may include the memory 170, and system modules supporting mobile-phone-communication capability. In alternate embodiments of the system, the subcomponent housing is configured to allow the motherboard to be replaceable and may be configured to have loose drop-in components. In this arrangement, an end user may configure the handlebar to include specific user-selected features, and may subsequently upgrade the unit, as needed. It is noted that that, in some arrangements of the system, the "subcomponent housing" may itself be structured and arranged to function as a "motherboard" on which computer components may be mounted.

The handlebar 22 may be equipped with hand-grip buttons 636 located on the right and left sides of the handlebar 22. The hand-grip buttons 636 may be used to operate one of more functions of the handlebar-mountable unit 600, the frame-mountable accessories 602, or both.

The subcomponent housing 614 may further include forward-facing vents 622 to assist in cooling system components located inside the housing, as the cycle is moving. The handlebar-mountable unit 600 may be equipped with a micro heat-pipe/plate, thermal-cycle condenser, exchanger, or similar cooler technology to cool and lower the temperature of the internal electronic components. The heat sinks may be coupled to heat-generating internal components to further assist in heat dissipation.

The handlebar-mountable unit 600 may include visual-display module 142, which may include a dedicated touch-screen display panel 300, as shown. The touch screen may be used as an interface to control one or more apps on the touch screen. The apps may be configured to alphanumeric keyboards, volume controls, etc. display on the touch-screen display panel 300. Moreover, a user may see their live-stream video, or reference a map via the touch-screen display panel 300.

In some embodiments of the handlebar-mountable unit 600, the visual-display module 142 may be coupled to a television receiver adapted to receive and process an over-the-air TV signal. For example, the handlebar-mountable unit 600 may be adapted to receive and process digital high-definition television (HDTV) in the United States.

It should be noted that compact versions without a screen may be provided. These smaller embodiments may be used with optical head-mounted displays, such as the smart glasses produced by Foxconn Technology Group and marketed under the brand name "Google Glass". Furthermore, it should be appreciated that, under appropriate circumstances, considering the above-noted issues, providing handlebar systems structured and arranged to operate without a dedicated onboard microprocessor; wherein, a user's mobile phone or similar device may be coupled with handlebar-mountable unit 600. In this arrangement, the user's device may comprise a human interface device, an analog data transmitter (wireless or otherwise), and a mobile device interface is used to communicate key functions such as volume level, music track skipping, etc. from the user to the phone or mobile computing device, wherein within this communication system, the main components may serve the following functions; the human interface device may provide options for the user to select and issue the above listed commands; the analog signal transmitter may encode these commands into a wired- or wirelessly-transmissible format which may under the appropriate circumstances be carried by an FM carrier signal, an AM carrier signal, an IR/optical signal, or a wired connection; and, the mobile device interface may receive the transmitted analog signal containing the issued commands and may convert these commands into a signal format appropriate for the receiving device, wherein communication ports supported by the mobile device interface may include (but are not limited to) the microphone/headphone jack, the USB power/data connection port, etc., wherein such non-microprocessor-based system arrangements may be achieved.

In this regard, the subcomponent housing 614 may include a mobile-device holder 140 fixed to the subcomponent housing 614. The mobile-device holder 140 may be adapted to hold the user's mobile computing device 110 during operation of the cycle 20. The mobile-device holder 140 may be arranged as a weather-tight enclosure having water-resistant gaskets and seals. Thus, the mobile computing device 110 may be conveniently held and protectively enclosed within the subcomponent housing 614 during use. Upon reading this specification, it should be appreciated that, under appropriate circumstances, considering such issues as user preferences, design preference, structural requirements, marketing preferences, cost, available materials, technological advances, etc., other pairing arrangements such as, for example, providing a cartridge feed assembly configured to slidably receive the mobile computing device within the subcomponent housing, providing cartridge feed assemblies adapted to securely hold a specific brand, model, or type of mobile computing device, providing a power cable within the holding enclosure to supply power from the onboard battery to the user's mobile computing device, etc., may be sufficient.

In some versions of the handlebar system 100, the communication module 152 may further comprise a mobile-device interface module 164, configured to form a paired communication link with at least one mobile-computing device 110. The mobile-device interface module 164 may operate via a wireless connection thus, allowing the handlebar-mountable unit 600 to interoperate with the user's own mobile computing device 110 when placed in the mobile-device holder 140 or located anywhere within wireless signal transmission range. Alternately, the mobile-device interface module 164 may operate via a wired connection. In this arrangement, the mobile-device holder 140 may be equipped with one or more device-compatible cables.

The processor 180 may be configured to execute the executable application 124 upon detection of user interaction with the handlebar system 100. In some embodiments of the present system, the processor 180 may be configured to execute the executable application 124 upon detection of a data-network connectable mobile-computing device 110, the local wireless device, or both, if within proximity of the handlebar-mountable unit 600. In this arrangement, a requesting device may be connected once appropriate credentials are determined. This determination may be based on stored information associated with the device or system.

As above, the handlebar-mountable unit 600 may additionally include a Global Positioning System (GPS) module 162. The GPS module 162 may be configured to receive location data associated with a geographic location of the handlebar-mountable unit 600 and cycle 20.

As above, multiple safety and security features may be incorporated within the handlebar-mountable unit 600. For example, the system may require the user to login with a variety of protocols, such as password, user name plus password, credit card scan or entry, RFID dongle, fingerprint login or other possible accreditation, in order to turn on, in unison, in progression, or in selection, various components within the handlebars. Prior to log in, operation of the components within the handlebars may be limited or disabled. This feature may be particularly useful in the operation of, for example, public bicycle sharing systems and rental cycles.

In some applications of the present system, the mobile computing device 110 may be sealed within the mobile-device holder 140 in a semi-permanent manner. By way of example, a bike-rental vendor may secure a computer tablet or similar mobile device within the holding enclosure using tamper-proof fasteners. The cover of the mobile-device holder 140 may include a transparent cover formed from a material compatible with the operation of the touch-screen display panel of the mobile computing device 110. In this arrangement, the mobile computing device 110 may form an interface between the rental customer and the bike-rental vendor. The rental customer may utilize the mobile computing device 110 to complete a rental transaction, receive map and route information, receive music and video content, etc. In some embodiments, the bike-rental vendor may use the system to monitor the location and status of the bike, send and display advertising content, etc. The system may allow for the registering of a recognized or unrecognized smart mobile device in order to gain use of the bicycle. In this arrangement, a user may utilize the network communication capability of the handlebar system to complete a rental transaction via a remote server. Alternately, the handlebar system may be configured to allow the rental transaction to be completed on the user's device via a paired connection with the handlebar system 100. Upon reading this specification, it should be appreciated that, under appropriate circumstances, considering such issues as user preferences, marketing preferences, cost, etc., other system interactions such as, for example, implementing communication between the handlebar system and one or more bicycle rental/storage stations, each station enabling a customer to rent, pickup, and return a bicycle, such stations including a locking mechanism adapted to release the bicycle once a rental has been validated by the system, etc., may be sufficient.

Similarly, a police department may install a mobile computing device 110 within the subcomponent housing 614 to allow a bicycle officer to receive and report information on locations, individuals, vehicles, etc. The device may be configured to operate over wireless networks dedicated to police functions.

The handlebar-mountable unit 600 may further include an audio-signal processing module 138 configured to process audio signals received from and sent to the mobile computing device 110. This added feature is configured to provide music and audio capability allowing cyclists and motorcycle riders to listen to music as they ride. Audio may also be important for police, either in speaking with their station, or in connecting to a loudspeaker effectively functioning as a bullhorn device. Those with ordinary skill in the art will now appreciate that upon reading this specification and by their understanding the art of audio processing as described herein, methods of implementing such devices will be understood by those knowledgeable in such art.

The handlebar-mountable unit 600 may further include a user-monitoring module 144 configured to monitor duration of use, location history, and user data. In addition, the handlebar-mountable unit 600 may include a security notification module 146 configured to report unauthorized use of the cycle 20 to which the apparatus is mounted. These security features may include one or more sensors, an alarm, and may interoperate with the processor 180 and onboard GPS module 162 to identify unauthorized movement or use of the cycle 20.

The system may be configured to communicate with a software application (i.e., App 187) installed on the user's mobile device. In this manner, the user or monitoring entity may be alerted to any unauthorized tampering or movement of the cycle 20. Alternately, the executable application 124 may include security codes or linkages, configured to interoperate with the "built-in" devices (e.g., handlebar phone/tablet/device). Such codes or linkages may include pin codes, "credit card authorization", physical keys, RFID identification, near-field communication, biometric fingerprint or retinal identification, verified user identification, private and/or public keys etc. The codes or linkages may be configured to control the onboard peripherals including the operation of items such as, cameras, system lock downs, and "physical lock engagements" installed in the cycle 20 or interoperating with the cycle. The code may be designed to utilize the speaker upon detection of unauthorized movement of the cycle 20 (e.g., sounding an alarm or play a prerecorded message annunciating that "this bike has been stolen", etc.)

Additionally, the handlebar-mountable unit 600 may further include an image-capture module 126 (including an external camera) configured to capture and store images. The image-capture module 126 may be configured to be controllable via the user interface 150 and/or by the mobile computing device 110 via the docked connection. The image-capture module 126 may be adapted to provide both still and motion-video-capture capability. The image-capture modules 126 may be "all-in-one wifi" cameras. As noted above, this feature permits users to record their rides for documentation, information, safety, etc. The image-capture module 126 may include multiple video-capture elements 136. Furthermore, the image-capture module 126 may be adapted to process video feeds from the multiple video-capture elements in real time. Thus, bicycle or motorcycle police may implement continuous and comprehensive video acquisition procedures.

It is noted that the handlebar-mountable unit 600 may be configured to communicate with at least one other remote device 132 via at least one wireless communication network 134 (or other wireless communication link). The remote devices 132 may include the frame-mountable accessories 602 or similar local wireless devices. Such links may include cellular networks, W-Fi networks, satellite networks, Bluetooth networks, networks using CAN bus protocols, ANT networks, FM networks, and the like. This feature allows the user to control the operation of the frame-mountable accessories 602 from the handlebar-mountable unit 600.

The user interface 150 may include radio selector buttons, web-based music access buttons, adapter control buttons to download music, and data/power access ports, among others. The user interface 150 may have one or more dedicated camera buttons to operate three cameras. These may include a front camera 632A and a self-shot camera 632B, located on the subcomponent housing 614, as shown. The self-shot camera may be used to record the user as they ride. The system may have one or more dedicated camera buttons to operate the lights. The subcomponent housing 614 may include external ports 634 providing external connection points for data, power, and audio signals.

Versions of the mobile computing device 110 may further include a visual-display module 142 configured to display images. The visual-display module 142 may be used to display phone information, text, graphics, still camera images, and video. In some embodiments of the handlebar system 100, the visual-display module 142 may include a touch-screen display panel 300 configured to generate a signal corresponding to a touched location within the touch-enabled surface. In other embodiments of the system, the touch-enabled surface may be used to implement the alphanumeric keyboard. Rear-view imagery (to see approaching traffic from behind) as well as near and far vehicle identification could also be shown on screen.

The user interface 150 may also include programmable buttons to allow the user to control the tilt, pan, zoom, and focus, of the onboard cameras. The user interface 150 may also include an on-off buttons, Bluetooth buttons, file transfer buttons, video capture buttons, and camera mode buttons. The user interface 150 may interoperate with one or more executable application 124 to download and save, share the user's videos, and pictures from the user's ride.

The system may include slots for memory cards, subscriber identification modules (commonly known as SIM cards 30), etc. The memory/SIM cards 30 may include the software (i.e., executable applications 124) needed to operate the system. Moreover, such SIM cards 30 may include an integrated circuit that is intended to securely store an international mobile subscriber identity (IMSI) number and its related key, which are used to identify and authenticate mobile communication devices (such as mobile phones and computers) within a communication network. All features are configured to work in a coordinated manner via the controls of the user interface 150.

It is noted that the embodiment of FIG. 11 may also include a dedicated mobile computing device 110 permanently or removably installed within the subcomponent housing 614. In this alternate arrangement, the subcomponent housing 614 may be structured and arranged to receive a mainboard or motherboard 302 containing the processor 180, memory 170, and system modules supporting mobile-phone-communication capability. The handlebar system may be equipped with a micro heat-pipe/plate, thermal-cycle condenser, exchanger, or similar cooler technology to cool and lower the temperature of the handlebar electronic components and to adjust the temperature comfort of the rider's interface, warming the handlebars for instance in the winter and cooling them in the summer.

The handlebar-mountable unit 600 may interoperate with a set of ancillary local wireless devices, such as, for example, the frame-mountable accessories 602 illustrated in FIG. 11 and FIG. 16 through FIG. 18.

Figure 16:
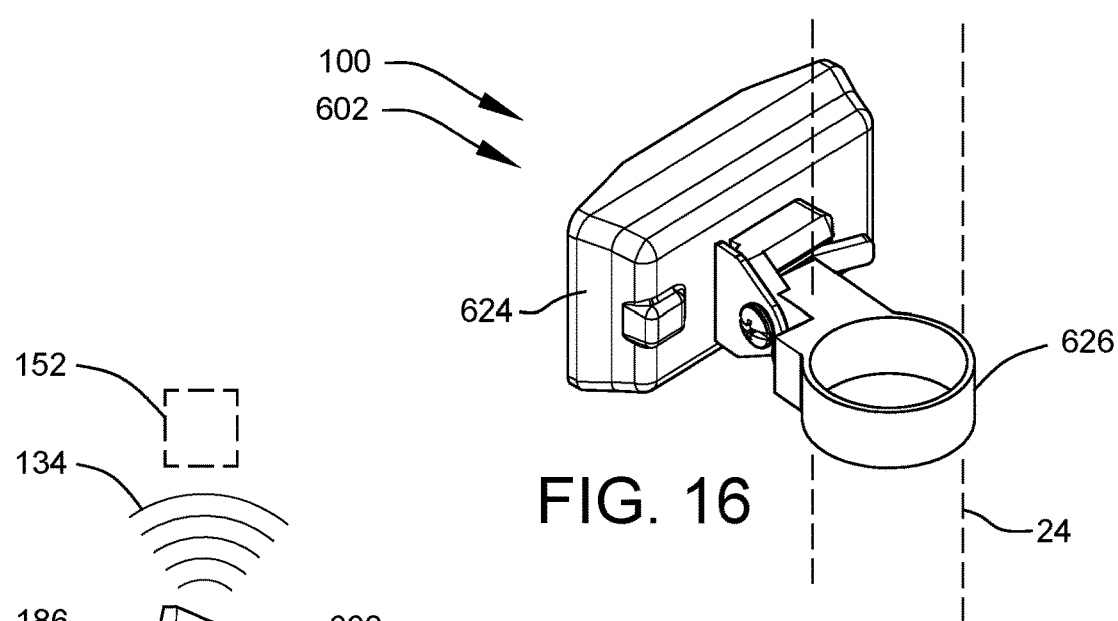
FIG. 16 is a rear perspective view of the frame-mountable accessory, according to the alternate embodiment of FIG. 11.
Figure 17:
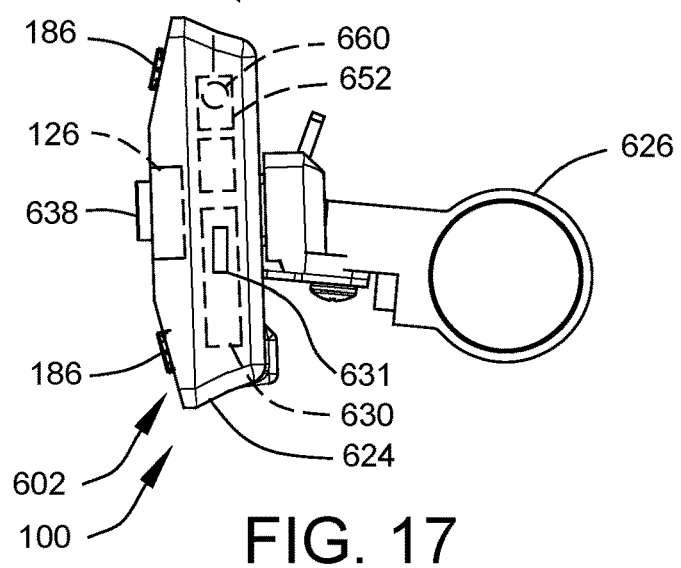
FIG. 17 is a top view of the frame-mountable accessory, according to the alternate embodiment of FIG. 11.
Figure 18:
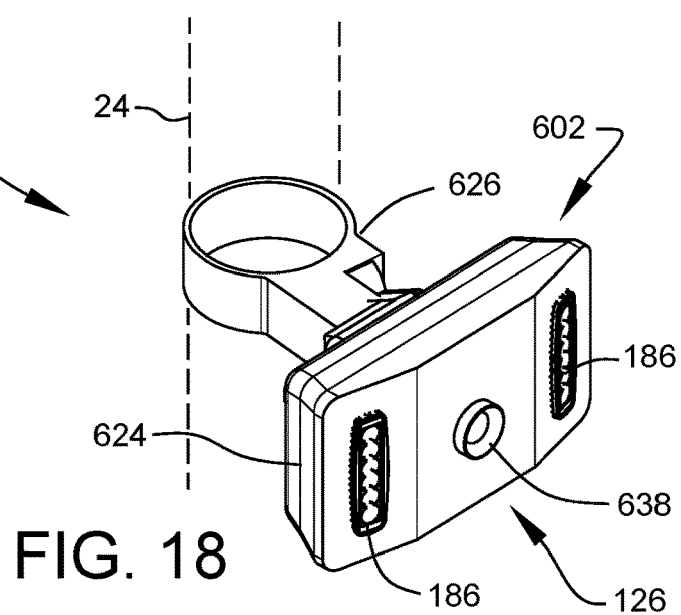
FIG. 18 is a top view of the frame-mountable accessory, according to the alternate embodiment of FIG. 11.

FIG. 16 is a rear perspective view of the frame-mountable accessory 602, according to the alternate embodiment of FIG. 11. FIG. 17 is a top view of the frame-mountable accessory 602, according to the alternate embodiment of FIG. 11. FIG. 18 is a top view of the frame-mountable accessory 602, according to the alternate embodiment of FIG. 11. In customary use, two frame-mountable accessory 602 are mounted to a single cycle 20. In this arrangement, one frame-mountable accessory 602 is mounted to a front frame portion 24 of the cycle 20 and one frame-mountable accessory 602 is mounted to a rear frame portion 24 of the cycle 20, as best illustrated in FIG. 11. Because the front frame-mountable accessory 602 is substantially identical in appearance and function to the rear frame-mountable accessory 602, FIG. 16 through FIG. 18 will be used to describe the features of both units.

Each frame-mountable accessory 602 may include a housing 624, mount 626, lights 186, and image-capture module 126 (including a camera 638). The frame-mountable accessories 602 may be configured to wirelessly communicate with the handlebar-mountable unit 600 such that the functional features of the device may be controlled from the main unit. Each frame-mountable accessory 602 may be an all-in-one unit containing reflectors, signals, built in battery with camera lens. The camera is adapted to enable Wi-Fi control of the camera 638.

The frame-mountable accessory 602 may include a wireless communication module 652 fixed within the housing 624 and electrically coupled to an onboard energy storage module 630. The communication module 652 may include a transceiver 660 configured to wireles sly communicate with the handlebar-mountable unit 600 via the wireless communication network 134 or other selected wireless communication link. More specifically, the transceiver 660 may be adapted to communicably couple with and establish full duplex communications between the frame-mountable accessory 602 and the communication module 152 of the handlebar-mountable unit 600. In this arrangement, commands from the frame-mountable accessory 602 may be sent to control the operation of the frame-mountable accessory 602 (i.e., turn the lights on and off, etc.) and image data from the image-capture module 126 may be sent back to the main handlebar-mountable unit 600 for recording, transmission, or display on the user interface 150 (see FIG. 4, FIG. 12). Those with ordinary skill in the art will now appreciate that upon reading this specification and by their understanding the art of wireless communications, as described herein, methods of implementing such devices will be understood by those knowledgeable in such art.

The storage module 630 may be an on-board battery pack, or other compact power supply. The energy storage module 630 may be located within the housing 624 and may allow the user to recharge the system via rechargeable batteries and a charge port 631.

The lights 186 of front frame-mountable accessory 602 may be configured to function as forward-illuminating headlights to assist the user in operating the cycle at night. In addition, the lights 186 of front frame-mountable accessory 602 may be configured to function as illuminated turn signals. The image-capture module 126 of the front frame-mountable accessory 602 allows riders to record images ahead of them.

The lights 186 of rear frame-mountable accessory 602 may be configured to function as taillights. The image-capture module 126 of the rear frame-mountable accessory 602 allows riders to record images behind them.

Referring again to FIG. 11, the handlebar 22 may be equipped with hand-grip buttons 636 located on the right and left sides of the handlebar 22. The left button may be configured to control the left turn signals of the frame-mountable accessories 602. The right button may be configured to control the right turn signals of the frame-mountable accessories 602. The hand-grip buttons 636 may be coupled to the main handlebar-mountable unit 600 by either a wired or a wireless connection. Alternately, the buttons may control the frame-mountable accessories 602 by way of a direct wireless connection.

The mount 626 may be configured to be detachably mounted on a tubular frame portion of the cycle 20 in a conventional manner, as shown. The mount 626 may be have a quick-release feature configured to allow the frame-mountable accessory 602 to be removable from the mount when not in use. Those with ordinary skill in the art will now appreciate that upon reading this specification and by their understanding the art of mounting accessories to the tubular frame of a cycle, as described herein, methods of implementing such devices will be understood by those knowledgeable in such art.

As previously noted, the handlebar-mountable unit 600 and frame-mountable accessories 602 may be configured for special-purpose applications including bike rental operations, police use, etc. Adaptations for police and law-enforcement use may include handlebar-mountable units 600 and frame-mountable accessories 602 having red and blue flashing lights, handlebar-mountable units 600 and frame-mountable accessories 602 having sirens, police-specific communication devices, cameras for collecting and recording video data, etc. It is noted that the law-enforcement versions may not be equipped with a cellular-communication component; rather, the law-enforcement versions may use conventional radio technology operating within any frequencies used by law enforcement entities, such as, for example, dedicated FM, VHF, or UHF police bands.

According to one embodiment, the device may be arranged as a kit 658, as illustrated in FIG. 11. The kit 658 may include a set of instructions 656, as shown. The instructions 656 may detail functional relationships in relation to the structure of the embodiment of the system (such that the embodiment can be used, maintained, or the like, in a preferred manner). The kit 658 may also contain one or more of the frame-mountable accessories 602 shown in FIG. 11. Upon reading this specification, it should be appreciated that, under appropriate circumstances, considering such issues as user preferences, design preference, structural requirements, marketing preferences, cost, available materials, technological advances, etc., other kit arrangements such as, for example, including mounting hardware, tools, rear view mirrors (or video displays), locks, antennae, credit-card readers, the cycle, etc., may be sufficient.

Figure 19:
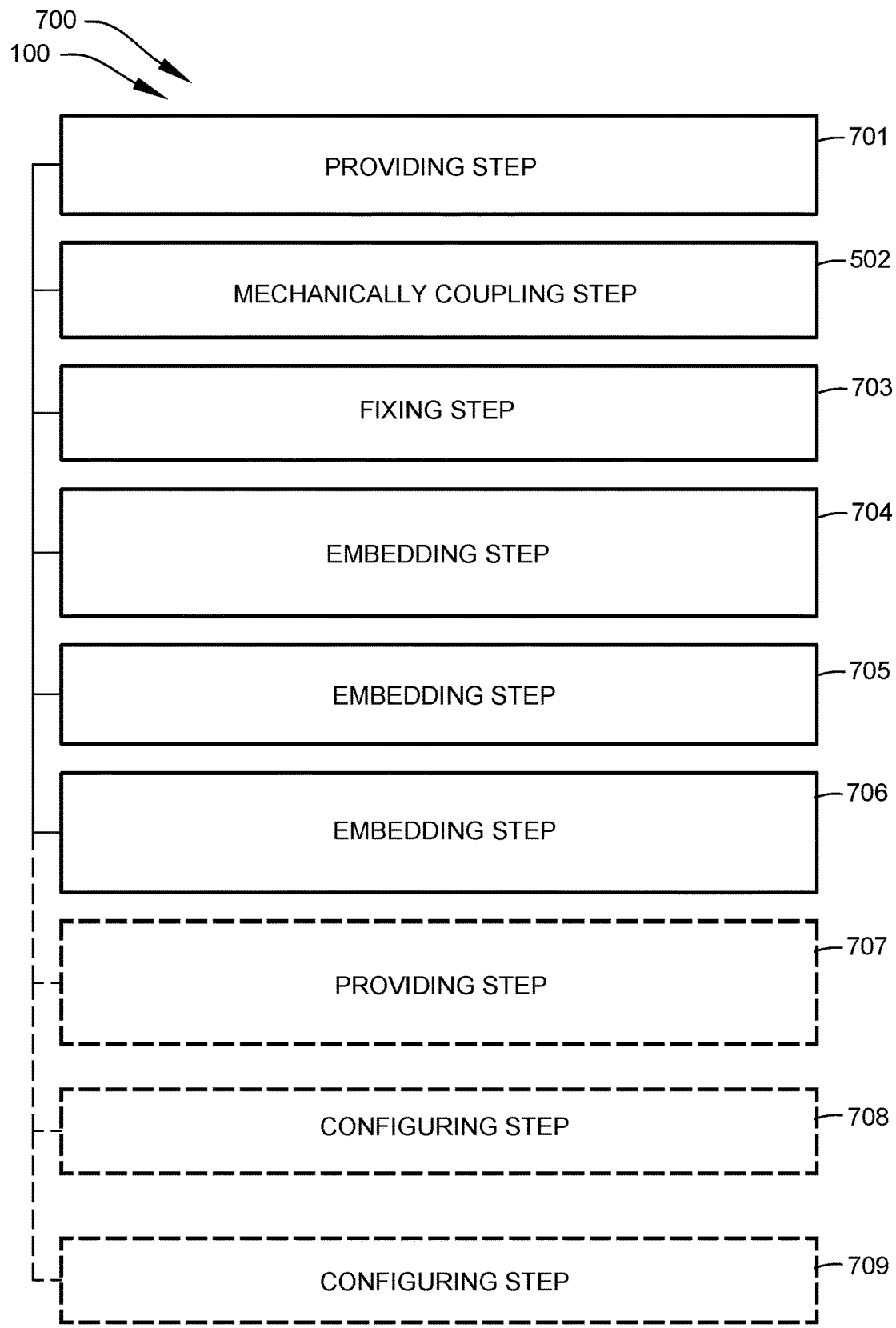
FIG. 19 is a flow diagram illustrating an alternate method of use for handlebar system, according to another embodiment of the present disclosure.

FIG. 19 is a flow diagram illustrating a method 700 of producing the above-described embodiments of handlebar system 100, according to the present disclosure. As illustrated, the method 700 may include the steps of: step one 701, providing a subcomponent housing mountable to the handlebar of the cycle; step two 702, mechanically coupling an energy storage module to the subcomponent housing; step three 703, fixing a user interface to the subcomponent housing, such user interface including a speaker, a microphone, and at least one manual input, such user interface adapted to communicate a command from the user; step four 704, embedding a communication module in the subcomponent housing, such communication module including a transceiver electrically coupled to the energy storage module, such transceiver configured to wirelessly communicate with at least one external communication network; step five 705, embedding a memory in the subcomponent housing, and such memory electrically coupled to the energy storage module, said memory configured to store an executable application, the executable application operable to communicably couple the communication module with at least one external communication network via the transceiver and establish a communication link there between, and provide for interoperation of the communication module and the user interface; and step six 706, embedding a processor in the subcomponent housing, such processor electrically coupled to the energy storage, and communicably coupled to the communication module, the memory, and the user interface, such processor configured to execute the executable application upon detection of user interaction with such handlebar system.

The method 700, may further comprise the steps of; step seven 707, providing a frame-mountable accessory configured to mount to a frame-portion of the cycle, the frame-mountable accessory including a housing, a mount configured to mount such housing to a frame portion of the cycle, an image capture module fixed to such housing and configured to capture images, at least one light fixed to such housing and configured to provide illumination, a secondary wireless communication module fixed to such housing and configured to wirelessly communicate with such transceiver, and an energy storage module configured to store electrical energy; step eight 708, configuring such energy storage module to be coupled to such housing, such image capture module, such at least one light, and such secondary wireless communication module; and step nine 709, configuring such image capture module and such at least one light to be controllable from such user interface via such wireless communication.

It should be noted that steps 707 through 709 are optional steps and may not be implemented in all cases. Optional steps of method 700 are illustrated using dotted lines in FIG. 19 so as to distinguish them from the other steps of method 700. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for the system (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the governing Patent and Trademark Offices and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A handlebar system for a cycle having a handlebar used to steer the cycle, the handlebar having a left hand end and a right hand end, the handlebar system comprising:
   a subcomponent housing;
      a mount configured to mount said subcomponent housing to the handlebar;
      a positional adjuster fixed to said mount, said positional adjuster adapted to permit positional adjustment of said subcomponent housing relative to the handlebar;
      an energy storage module mechanically coupled to the subcomponent housing;
      a user interface fixed to the subcomponent housing, and including a speaker, a microphone, and at least one manual input, said user interface adapted to communicate a command from a user;
      a communication module fixed to the subcomponent housing and electrically coupled to the energy storage module, said communication module including a transceiver electrically coupled to the energy storage module, said transceiver configured to wirelessly communicate with at least one external communication network;

a memory electrically coupled to the energy storage module, said memory configured to store an executable application, the executable application operable to communicably couple the communication module with at least one external communication network via the transceiver and establish a full duplex communication link there between, and provide for interoperation of the communication module and the user interface; and a processor embedded in the subcomponent housing, electrically coupled to the energy storage module, and communicably coupled to the communication module, the memory, and the user interface, said processor configured to execute the executable application upon detection of user interaction with said handlebar system.

2. The handlebar system of claim 1, wherein the communication module comprises a mobile-device interface module, said mobile-device interface module configured to form a paired communication link with at least one mobile-computing device of the user.

3. The handlebar system of claim 2, further comprising an image-capture module configured to capture and store images, and to be controllable by at least one of the user interface, and the mobile computing device via said mobile-device interface module.

4. The handlebar system of claim 3, wherein said image-capture module includes multiple video-capture elements, and is adapted to process video feeds from each of the multiple video-capture elements in real time.

5. The handlebar system of claim 2, wherein said mobile-device interface module is adapted to communicably couple with the mobile computing device via at least one wireless connection.

6. The handlebar system of claim 2, further comprising a mobile-device holder fixed to the subcomponent housing, said mobile-device holder adapted to hold the mobile computing device during operation of the cycle.

7. The handlebar system of claim 6, wherein said mobile-device holder comprises a weather-tight enclosure configured to protectively enclose the mobile computing device during operation of the cycle.

8. The handlebar system of claim 1, wherein said communication module is configured to wirelessly communicate with said at least one external communication network selected from the group consisting of a cellular network, a Wi-Fi local area network, a satellite network, a Bluetooth personal area network, a controller area network (CAN bus), an ANT multicast wireless sensor network, and an FM network.

9. The handlebar system of claim 1, further comprising at least one audio-signal processing module configured to process audio signals received from and sent to the user interface.

10. The handlebar system of claim 1, wherein the at least one manual input of the user interface includes an alphanumeric keyboard and a manually adjustable volume control.

11. The handlebar system of claim 1, wherein the user interface further includes at least one visual-display module configured to display images.

12. The handlebar system of claim 11, wherein the at least one visual-display module includes a touch-enabled surface configured to generate a signal corresponding to a touched location within the touch-enabled surface.

13. The handlebar system of claim 1, further comprising a user-monitoring module configured to at least monitor duration of use, location history, and user data.

14. The handlebar system of claim 1, further comprising a security notification module configured to report unauthorized use of the handlebar system.

15. The handlebar system of claim 1, further comprising:
a frame-mountable accessory configured to mount to a frame-portion of the cycle;
wherein the frame-mountable accessory includes
a housing,
a mount configured to mount said housing to a frame portion of the cycle,
an image capture module fixed to said housing and configured to capture images,
at least one light fixed to said housing and configured to provide illumination,
a secondary wireless communication module fixed to said housing and configured to wirelessly communicate with said transceiver, and
an energy storage module configured to store electrical energy;
wherein said energy storage module is coupled to said housing, said image capture module, said at least one light, and said secondary wireless communication module; and
wherein said image capture module and said at least one light are controllable from said user interface via said wireless communication.

16. The handlebar system of claim 1, further comprising:
at least one user control button configured to be mountable to the handlebar;
wherein said at least one user control button is operably coupled to said processor embedded in said subcomponent housing.

17. A handlebar system for a cycle having a handlebar used to steer the cycle, the handlebar having a left hand end and a right hand end, the handlebar system comprising:
a subcomponent housing;
a mount configured to mount said subcomponent housing to the handlebar,
a positional adjuster fixed to said mount, said positional adjuster adapted to permit positional adjustment of said subcomponent housing relative to the handlebar, and
a quick-release to permit quick-release of said subcomponent housing from said mount;
an energy storage module mechanically coupled to the subcomponent housing;
a user interface fixed to the subcomponent housing, and including a speaker, a microphone, and at least one manual input, said user interface adapted to communicate a command from a user;
a communication module fixed to the subcomponent housing, said communication module including
a transceiver electrically coupled to the energy storage module, said transceiver configured to wirelessly communicate with at least one external communication network;
a memory electrically coupled to the energy storage module, said memory configured to store an executable application, the executable application operable to
communicably couple the communication module with at least one external communication network via the transceiver and establish a full duplex communication link there between, and provide for interoperation of the communication module and the user interface;

a processor embedded in the subcomponent housing, electrically coupled to the energy storage module, and communicably coupled to the communication module, the memory, and the user interface, said processor configured to execute the executable application upon detection of user interaction with said handlebar system;

a data-card slot, mechanically coupled to the subcomponent housing and operably coupled to the memory and the processor, said data-card slot configured to receive a data card;

a mobile-device interface module, mechanically coupled to the subcomponent housing and electrically coupled to the energy storage module, said mobile-device interface module configured to form a paired communication link with at least one mobile-computing device of the user;

an image-capture module configured to capture and store images, and to be controllable by at least one of the user interface, and the mobile computing device via said mobile-device interface module;

at least one audio-signal processing module configured to process audio signals received from and sent to the user interface;

at least one sensor; and a mobile-device holder fixed to the subcomponent housing, said mobile- device holder adapted to hold the mobile computing device during operation of the cycle;

wherein said image-capture module includes multiple video-capture elements, and is adapted to process video feeds from each of the multiple video-capture elements in real time;

wherein said mobile-device interface module is adapted to communicably couple with the mobile computing device via at least one wireless connection;

wherein said mobile-device holder comprises a weather-tight enclosure configured to protectively enclose the mobile computing device during operation of the cycle;

wherein said communication module is configured to wirelessly communicate with said at least one external communication network selected from the group consisting of a cellular network, a Wi-Fi local area network, a satellite network, a Bluetooth personal area network, a controller area network (CAN bus), an ANT multicast wireless sensor network, an HDTV network, and an FM network;

wherein said communication module is configured to interoperate with at least one of an RFID interface and a bank-card reader; and wherein the user interface further includes at least one visual-display module configured to display images.

18. The handlebar system of claim 17, further comprising set of instructions; and wherein the handlebar system is arranged as a kit.

19. A method for producing a device for a cycle having a handlebar, the method comprising the steps of:

providing a subcomponent housing mountable to the handlebar of the cycle;

mechanically coupling an energy storage module to the subcomponent housing;

fixing a user interface to the subcomponent housing, said user interface including a speaker, a microphone, and at least one manual input, said user interface adapted to communicate a command from the user;

embedding a communication module in the subcomponent housing, said communication module including a transceiver electrically coupled to the energy storage module, said transceiver configured to wirelessly communicate with at least one external communication network;

embedding a memory in the subcomponent housing, and said memory electrically coupled to the energy storage module, said memory configured to store an executable application, the executable application operable to communicably couple the communication module with at least one external communication network via the transceiver and establish a communication link there between, and provide for interoperation of the communication module and the user interface;

embedding a processor in the subcomponent housing, said processor electrically coupled to the energy storage, and communicably coupled to the communication module, the memory, and the user interface, said processor configured to execute the executable application upon detection of user interaction with said handlebar system;

and providing a frame-mountable accessory configured to mount to a frame-portion of the cycle; the frame-mountable accessory including a housing, a mount configured to mount said housing to a frame portion of the cycle, an image capture module fixed to said housing and configured to capture images, at least one light fixed to said housing and configured to provide illumination, a secondary wireless communication module fixed to said housing and configured to wirelessly communicate with said transceiver, and an energy storage module configured to store electrical energy;

configuring said energy storage module to be coupled to said housing, said image capture module, said at least one light, and said secondary wireless communication module;

and configuring said image capture module and said at least one light to be controllable from said user interface via said wireless communication.

* * * * *